United States Patent [19]
Cochran et al.

[11] Patent Number: 5,269,641
[45] Date of Patent: Dec. 14, 1993

[54] INTERFACE FOR CARGO LOADERS

[75] Inventors: Joseph W. Cochran, Pebble Beach; Victor H. Carder, Kelseyville, both of Calif.

[73] Assignee: Joseph W. Cochran Associates, Pebble Beach, Calif.

[21] Appl. No.: 34,769

[22] Filed: Mar. 19, 1993

Related U.S. Application Data

[60] Division of Ser. No. 770,114, Oct. 2, 1991, Pat. No. 5,219,259, which is a continuation-in-part of Ser. No. 594,146, Oct. 10, 1990, Pat. No. 5,118,241.

[51] Int. Cl.$^5$ .............................................. B60P 1/52
[52] U.S. Cl. .............................................. 414/345
[58] Field of Search .............................. 414/345–347, 414/495, 280, 282, 283, 661, 529, 535, 584, 401, 398, 502, 503, 505, 523, 390–392, 349, 351, 352; 198/313, 588, 782; 14/69.5, 71.1

[56] References Cited

U.S. PATENT DOCUMENTS

| | | | |
|---|---|---|---|
| 1,073,376 | 9/1913 | Vivian | 414/398 X |
| 2,379,094 | 6/1945 | Maxon, Jr. | 414/347 |
| 2,926,797 | 3/1960 | Decker | 414/347 |
| 3,051,295 | 8/1962 | Moy | 198/313 |
| 3,126,112 | 3/1964 | Shaw et al. | 414/495 |
| 3,357,582 | 12/1967 | Wittek | 414/495 |
| 3,589,490 | 6/1971 | Walkhoff et al. | 414/347 X |
| 3,599,784 | 8/1971 | Rossi | 414/345 |
| 3,666,127 | 5/1972 | Guyaux | 414/495 |
| 3,687,321 | 8/1972 | Goodhart et al. | 414/495 |
| 3,819,068 | 6/1974 | Weir | 414/398 X |
| 3,944,096 | 3/1976 | Carder | 414/345 |
| 3,952,886 | 4/1976 | Hazne | 414/392 |
| 3,972,427 | 8/1976 | Stanley et al. | 414/495 X |
| 4,084,751 | 4/1978 | Galis | 414/345 X |
| 4,089,100 | 5/1978 | Berry, Jr. | 414/495 X |
| 4,304,518 | 12/1981 | Carder et al. | 414/495 |
| 4,593,810 | 6/1986 | Cook | 414/535 X |
| 4,783,190 | 11/1988 | Lovgren | 414/347 |
| 4,799,848 | 1/1989 | Buckley | 414/347 |
| 5,118,241 | 6/1992 | Cochran et al. | 198/313 |

FOREIGN PATENT DOCUMENTS

| | | | |
|---|---|---|---|
| 8602026 | 3/1988 | Netherlands | 414/535 |
| 2102377 | 2/1983 | United Kingdom | 414/401 |

Primary Examiner—David A. Bucci
Attorney, Agent, or Firm—Beveridge, DeGrandi, Weilacher & Young

[57] ABSTRACT

An interface system for cargo loaders which is especially suited for use with aircraft cargo loaders. The interface is secured to a deck structure forming part of the cargo loader. The interface system includes a primary interface member which can be extended or retracted with respect to the end of the deck. In addition to extension and retraction, the primary interface member can be angularly adjusted with respect to the end of the deck. In one embodiment a secondary interface member is stowed adjacent to the primary interface or nested within a recess formed in the primary interface. The secondary interface can be extended or retracted with respect to the primary interface member. The secondary interface can also be designed for angular adjustment. The primary interface also includes lateral extension members which can be varied in position to either decrease or increase the transverse length of the primary interface member. The flexibility in elongation, retraction and angular positioning of the interface system enables a loader to be used with a greater variety of cargo loading areas and is especially useful in adapting to the multitude of different aircraft cargo doors, especially those with recessed door sills.

24 Claims, 15 Drawing Sheets

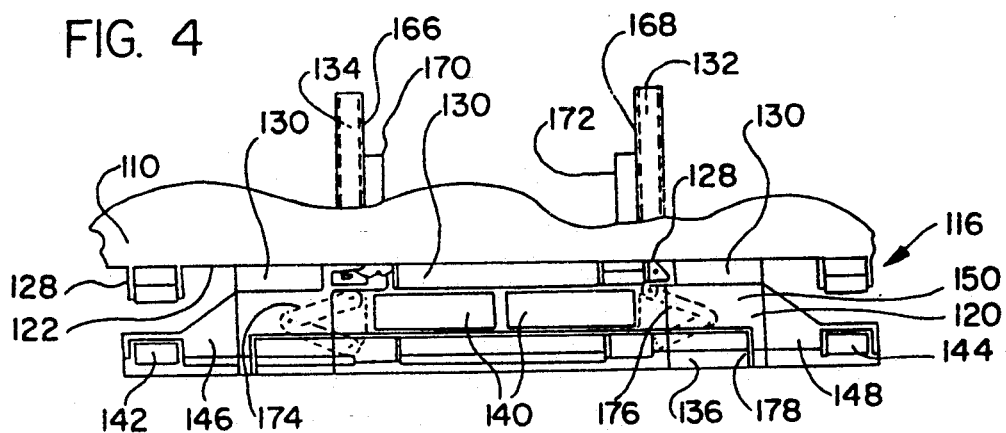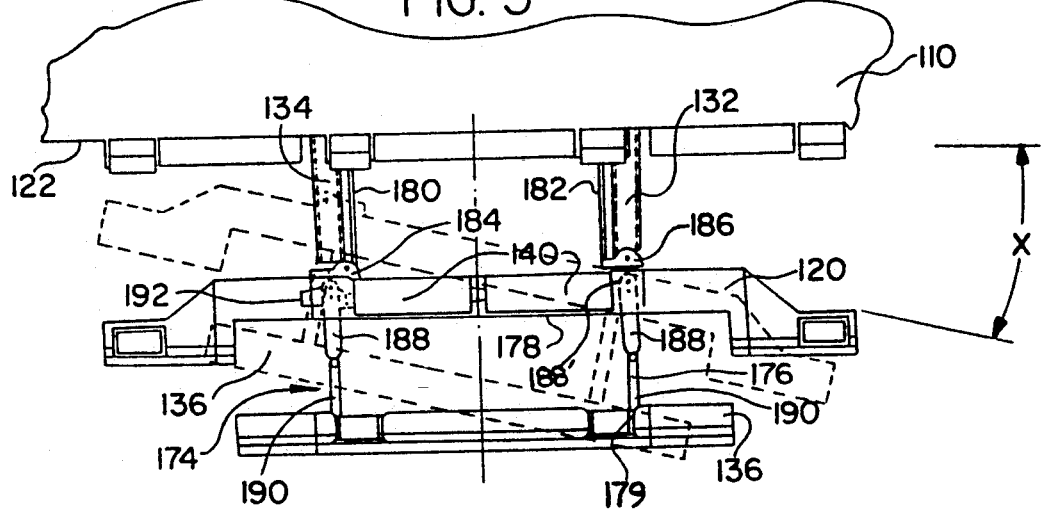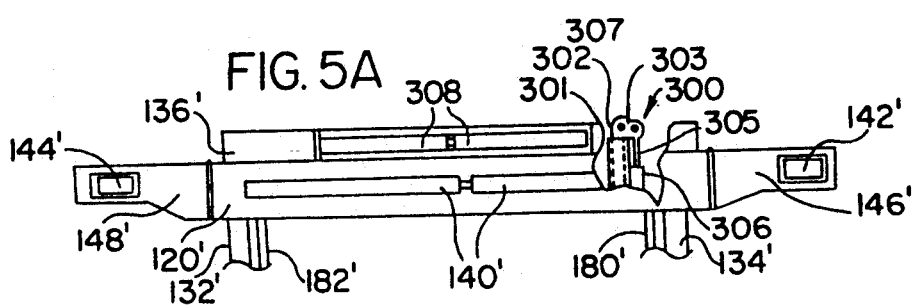

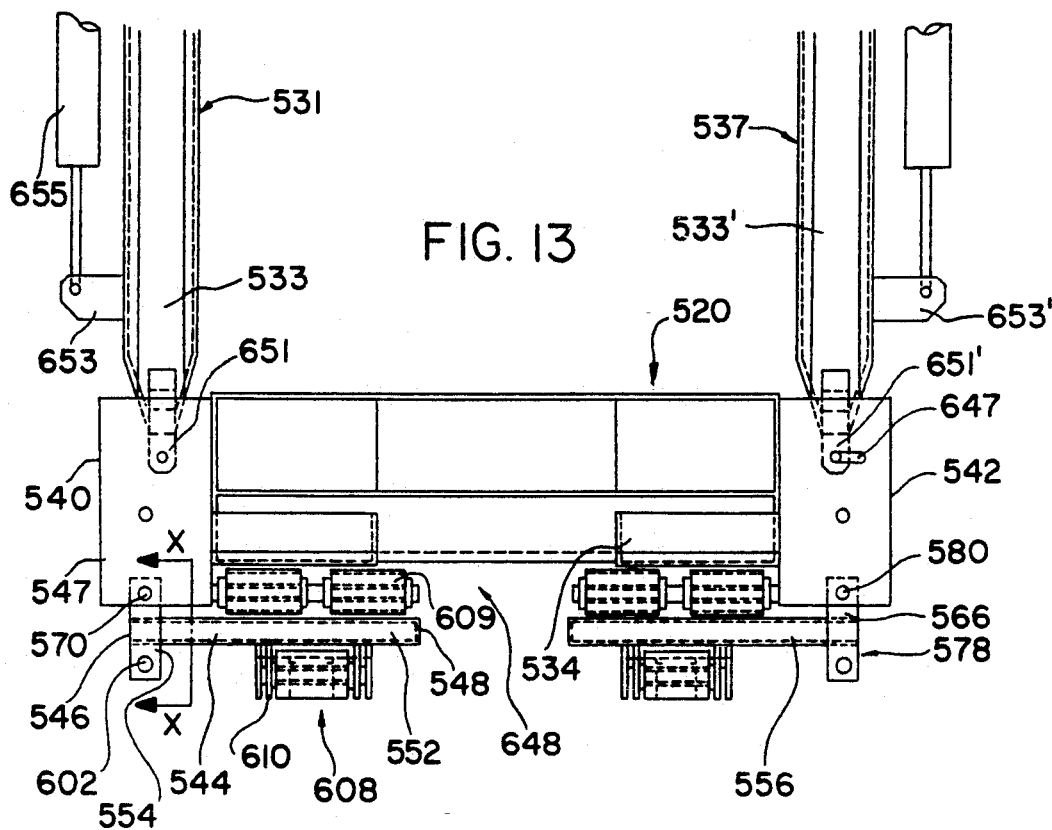
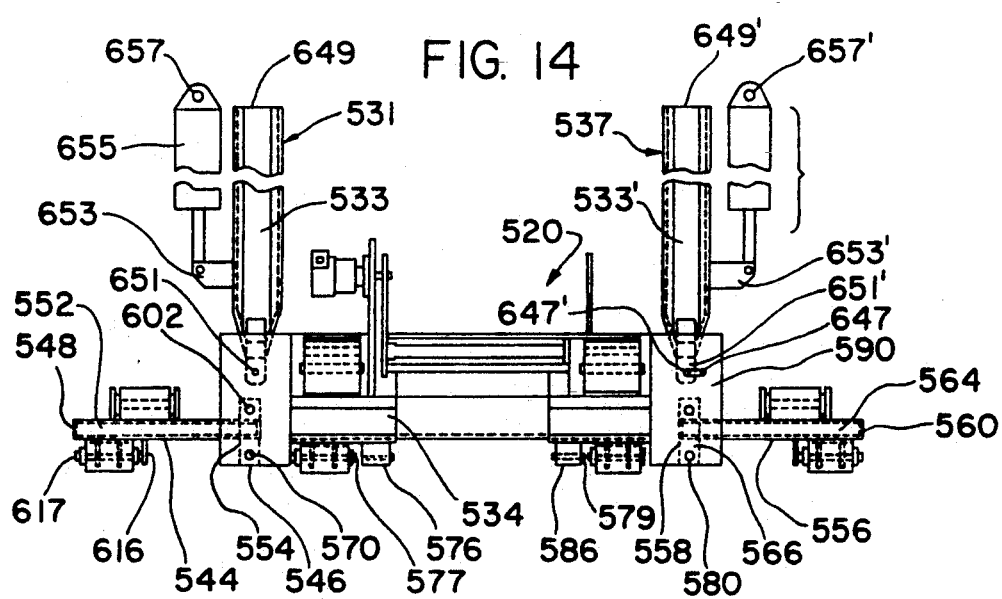

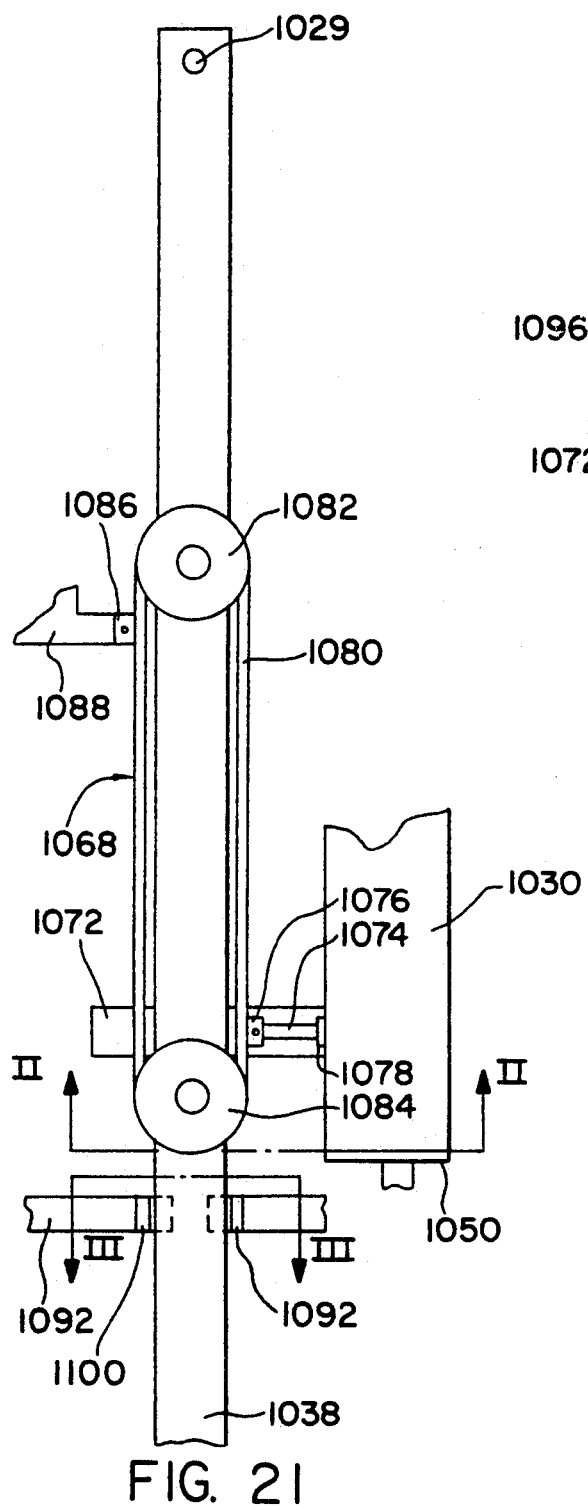
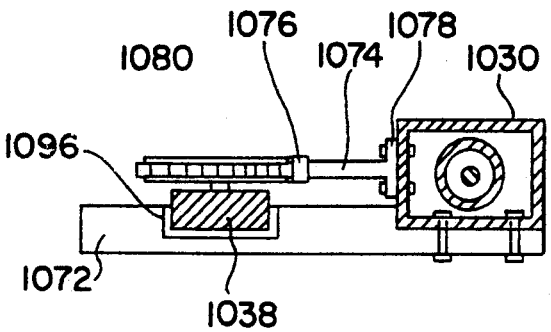
FIG. 22
FIG. 21
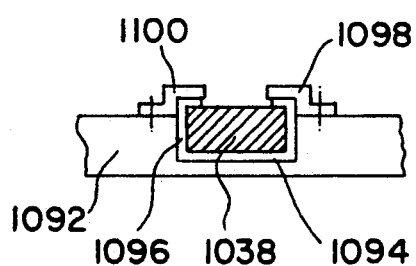
FIG. 23

INTERFACE FOR CARGO LOADERS

This is a divisional of co-pending application Ser. No. 07/770,114 filed on Oct. 2, 1991, now U.S. Pat. No. 5,219,259 which is a continuation-in-part of U.S. Ser. No. 07/594,146 filed Oct. 10, 1990 and now U.S. Pat. No. 5,118,241.

BACKGROUND OF THE INVENTION

Field of the Invention

This invention relates to an interface for a cargo loader which includes means for adjusting to accommodate different size docking means and positions. More specifically, this invention relates to an articulating interface especially suited for use with an aircraft cargo loader.

The commercial and military fleet of cargo aircraft is very diverse with each airplane having one or more possible cargo compartments and loading doors. Because of the predominance of wide body aircraft in the transport fleet, the tendency has been towards the development and fielding of large multipallet loaders having their own propulsion means and powered container handling features.

Since many commercial and military cargo aircrafts can be loaded from front or rear doors, the loader body width has usually been made in the prior art of a width of 96, 108, or 125 inches to accommodate the various standard wide-body pallets and containers. However, many lower deck doors and access openings on relatively small aircraft are smaller in width than 96 inches (e.g., 60-90 inches).

Moreover, the prior art cargo loading equipment, used to access smaller aircraft doors recessed into the fuselage of the airplane, generally consisted of container lifts made narrow to fit the smaller openings associated with such aircraft cargo doors. Some prior art cargo lifts require that the containers be manually pushed on and pushed off the cargo loader. Thus, in addition to not being flexible enough to handle the diverse range of aircraft loading and unloading cargo areas, such prior art cargo loading equipment also require excessive handling in loading and unloading containers from an aircraft.

U.S. Pat. No. 3,944,096 illustrates an angularly adjustable, powered interface for use with a freight transporter and loader. The angular adjustment feature of the interface of U.S. Pat. No. 3,944,096 enables the operator to adjust the loader for accessing "behind the wing" cargo doors. U.S. Pat. No. 3,944,096, however, fails to provide access to aircraft cargo compartments of all recent wide and narrow body cargo aircraft and requires a high degree of user expertise in positioning the loader.

SUMMARY OF THE INVENTION

The present invention presents a solution to the above-noted problems concerning the lack of flexibility in the prior art aircraft cargo loaders and their inability to handle the diverse range of aircraft cargo openings. In addition, the present invention provides the required flexibility while also avoiding difficult operation procedures such that an operator can easily handle the system and load and unload an aircraft at a relatively fast rate.

The following summary description is made in reference to an interface system specifically adapted for use with an aircraft cargo loader. The present invention can also be useful in association with other vehicles having similar requirements to that of an aircraft cargo loader. However, the present invention is especially suited for handling the diverse range of aircraft cargo access openings.

One embodiment of the interface system of the present invention includes a deck and a primary interface connected to the deck by way of connecting means. The connecting means for connecting the primary interface to the deck includes a first extension-retraction means for extending and retracting the primary interface with respect to the deck. The primary interface has a recess or a receiving area formed along one of its sides which is dimensioned to receive, in stowable fashion, a secondary interface member. Alternatively, the secondary interface member may be retracted against the primary interface and stowed adjacent the primary interface without the use of a recess. In either situation it is preferable to have the upper surface of the primary interface essentially coplanar with the upper surface of the secondary interface. Also, when a recess is used, it is preferable to have the recess deep enough to place the front edge of the secondary interface essentially coplanar with the front edge of the primary interface. The recess should also open into the upper surface of the primary interface such that when the secondary interface is in its stowage position its upper surface is coplanar with the primary interface.

The secondary interface member is secured to the primary interface member by way of securement means. The securement means includes a second extension-retraction means for extending and retracting the secondary interface with respect to the primary interface. The secondary interface can thus be stowed or nested away against or within the primary interface and extended out away from the primary interface.

The primary interface includes a first outboard end and a second outboard end. The first extension-retraction means includes a first extension-retraction member and a second extension-retraction member. The first extension-retraction member is secured to the primary interface closer to the first outboard end than to the second outboard end while the second extension-retraction member is secured to the primary interface at a position closer to the second outboard end than to the first outboard end. Furthermore, the first and second extension-retraction members are pivotably connected to the primary interface and each extension-retraction member is individually extendable and retractable such that the primary interface can be angularly adjusted with respect to the deck by varying the amount of extension and retraction of the first and second extension-retraction members.

In a preferred embodiment, the first and second extension-retraction members include a hydraulic cylinder, a tubular guide positioned adjacent the hydraulic cylinder and secured to the under surface of the deck, a support arm slidingly received in the tubular guide, and a bracket member. The bracket member is pivotably joined at one end to the hydraulic cylinder and pivotably joined at its other end to the support arm. In addition, the bracket is secured to the primary interface. Alternatively, the hydraulic cylinder could be maintained within the tubular guide and tubular support arm. In either situation, when the hydraulic cylinder is extended for one extension-retraction member and the hydraulic cylinder for the other extension-retraction member is retracted, the primary interface member is set at an angle with respect to the end edge of the deck. Preferably, the maximum angle amount is about 15 degrees with respect to a center line extending parallel with the end edge of the deck.

The primary interface also preferably includes a first lateral extension positioned at the first outboard end a second lateral extension positioned at the second outboard end. The first and second lateral extensions include pivotable connection means as well as means to lock the lateral extensions into a first position wherein an upper surface of the lateral extensions is generally planar with an upper surface of the remaining main body portion of the primary interface and into a second position wherein the lateral extensions are locked in place below the upper surface of the main body portion of the primary interface. In this embodiment, the lateral extensions pivot about a horizontal axis such that the lateral extensions pivot from an upper position to a position below the main body portion of the primary interface. For example, by rotating downwardly two 15 inch lateral extensions positioned at opposite ends of the main body portion of the primary interface and locking those lateral extensions, preferably along the underside of the primary interface, a 92 inch wide primary interface can be reduced to 62 inches. By designing the secondary interface to have a width of 60 inches, the combination of the 62 inches and 60 inches interface members enables use of the loader with respect to certain aircraft which require the primary interface to also be extended into the fuselage cutout or access opening. In fact, the door sill of the lower deck cargo doors of certain airplanes, such as that of a 747 or DC-10 aircraft, is recessed within the outer skin of the aircraft and some lower deck cargo doors are only wide enough (about 65 inches) to take 60 inch wide containers.

Further, some aircraft have a wing fillet which makes the loading or unloading operation even more problematic. With aircraft having recessed door sills and/or wing fillets, the primary and secondary interfaces must extend into the opening to reduce the gap over which the pallets and containers must pass.

If it was possible to extend the secondary interface without lowering or retracting the lateral extensions, the operator might extend the primary interface to reduce the gap and damage the skin and/or fairing of the airplane. Accordingly, as explained in greater detail below, means are provided to monitor the positioning of the secondary interface and lateral extensions such that the lateral extensions are not extended when the secondary interface is extended. With the secondary interface retracted, the primary interface can be extended with the lateral extensions outwardly extending so as to align the primary interface with wider door openings.

The invention also contemplates the use of one or more power rollers which are positioned on the primary interface. Means for drivingly rotating the power roller or rollers is preferably attached to the primary interface in a position below the under surface of the primary interface. A preferred embodiment also provides means for manipulating the power rollers either to a first position wherein the power rollers are above the upper planar surface of the primary interface and adapted for contact with cargo or to a second position wherein the power rollers are recessed so as to be flush with or below the upper planar surface of the primary interface. In addition to power rollers, nonpowered or idler rollers can also be provided to assist in the conveyance of cargo loads across the extended interface. The idler rollers are preferably provided on the lateral extensions to assist in conveyance of cargo over the extremities of the primary interface. When the primary interface is set at an angle in one direction or another, the power rollers assist in turning the containers to the new direction of travel required for on/off loading.

The second extension-retraction means includes a first set of link members and a second set of link members transversely spaced from one another. The first and second sets of link members each include a first link member pivotably secured to the primary interface and a second link member pivotably secured to the first link member at one end and to the secondary interface at the other end. This arrangement enables the folding of the secondary interface into the recess formed in the primary interface or into a position adjacent the front of the primary interface. The first and second sets of link members also each include releasable locking means such as a locking pin extending through an aperture spaced from the common pivot point of the two link members. The secondary interface preferably is provided with at least one roller to assist in the conveyance of cargo across the interface and onto the deck.

The invention further contemplates providing the secondary interface with a powered roller or rollers. In addition, rather than relying on the link members, the secondary interface can be mounted to the primary interface in a manner similar to the arrangement used to secure the primary interface to the deck structure. The latter arrangement provides for even a greater degree of angular adjustment as both the primary and secondary interfaces can be angularly adjusted.

The invention also contemplates the use of spring loaded rollers and a plurality of bumpers placed serially across the front end edge of the deck. The spring loaded rollers are designed to retract into a recess formed in the edge of the deck whenever the primary interface is in abutment with the end of the deck. Once the primary interface is extended the spring loaded rollers extend into a position to assist in the conveyance of cargo between the primary interface and the deck.

In one embodiment of the invention, a safety feature is provided such that whenever the secondary interface is extended from its stowed position, the primary interface is precluded from being extended until the two lateral extensions have been rotated down and locked in place. Accordingly, detection means is relied upon both to determine whether the secondary interface is in an extended position and whether the lateral extensions are in an up or down position. Preferably, the detection means is in communication with control means for controlling the electrical or fluid input to the first extension-retraction means so as to enable either the activation or deactivation of the first extension-retraction means. If the detection means determines that the secondary interface is in an extended position and a lateral extension is still in an up position, than the detection means will signal the control means to deactivate the first extension-retraction means such that the primary interface cannot be extended. Alternatively, a mechanical latch in the lateral extensions can be provided to prevent extension of the secondary interface with the lateral extensions in an up position; and, conversely, to prevent the raising of the lateral extensions with the secondary interface extended.

An additional contemplated feature of the present invention is the inclusion of a pair of notched passageways in the primary interface and a pair of covers which can be releasably secured in the notched passageways. The notched passageway include tine ways for facilitating the positioning of fork lift tines during the removal and loading of containers at the front of the loader by means of a forklift or similar device.

In yet another embodiment of the invention, the first and second extension-retraction means are positioned in spaced relationship with respect to one another and each has a first end supported by the deck of the cargo loader. An interface assembly is secured to the second end of the first and second extension-retraction means. The interface assembly includes a main body with an upper and a lower surface and a first and a second end. The first end of the main body is pivotably secured to the second end of the first extension-retraction means and the second end of the main body is pivotably secured to the second end of the second extension-retraction means.

The embodiment further includes first and second lateral extensions extending off of the first and second ends of the main body. The first lateral extension member has a first end pivotably secured to the first end of the main body such that the first end of the first lateral extension is free to pivot about an axis which extends between the upper and lower surface of said main body (e.g. vertical axis). The second lateral extension has a first end pivotably secured to the second end of the main body. The first end of the second lateral extension also pivots about an axis which extends between the upper and lower surface of the main body.

First locking means is provided for locking the first lateral extension in an extended position wherein the first lateral extension extends out away from both the first and second extension-retraction means. A first locking member is also positioned on the first lateral extension for engagement with a spring driven pin supported by the main body when the first lateral extension is to be fixed in a retracted position. In the retracted position, the first lateral extension extends out away from the first extension-retraction means and towards the second extension-retraction means. The first lateral extension is also spaced from and parallel to the front end of the main body.

Second locking means is also provided for locking the second lateral extension in an extended position wherein the second lateral extension-retraction means extends out away from both of the first and second extension-retraction means. A second locking member is also positioned on the second lateral extension for engagement with a spring driven pin supported by the main body when the second lateral extension member is to be placed in a retracted position. In the retracted position, the second lateral extension extends out away from the second extension-retraction means and towards the first extension-retraction means and has a front surface which is essentially coplanar to the front surface of the retracted first lateral extension and parallel with respect to the front face of the main body.

Each of the first and second lateral extensions in this embodiment include a support beam. The first and second lateral extensions also each include at their first end a bracket member extending transverse to the support beam and a pivot pin secured to the main body and pivotably secured to the bracket member on one side of the support beam. The first and second locking means each further comprise disengageable engagement means supported by the bracket member on the other side of the support beam. The engagement means releasably fixes the lateral extensions in the extended position. The preferred embodiment also includes exterior roller assemblies positioned on each of the lateral extensions. The roller assemblies include rollers and releasable locking means. The releasable locking means, when engaged, lock the rollers in a raised position (above the upper surface of the main body) and when disengaged result in the rollers being lowered below the upper surface of the main body.

The present invention further comprises interior roller assemblies (e.g., two pairs) which include rollers and releasable locking means. The releasably locking means, when engaged, position the rollers in a raised position and, when disengaged, result in the rollers being lowered below the upper surface of the main body. External rollers positioned on one side of the support beams of the lateral extensions are spaced such that their axis of rotation is essentially aligned with the axis of rotation of interior rollers supported by the front of the main body when the lateral extensions are in the retracted position.

The disengageable engagement means of the preferred embodiment includes a cylinder which is supported by the bracket member and has a slot extending axially along the cylinder. A pair of engagement pins are positioned within the cylinder and include gripping means which extend through the slot. A spring is positioned within the cylinder and between the engagement pins so as to bias the pins outwardly towards and partially out past the open ends of the cylinder. The gripping means abut the ends of the slot so as to limit the amount the pins extend out past the open ends of the cylinder. Holes or recesses are provided in upper and lower flanges forming part of the lateral extension brackets. Holes or recesses are also provided in upper and lower plates of the main body. The holes in the upper and lower plates are aligned with the holes in the flanges such that the outwardly biased pins extend through the flange holes and recesses or holes provided in the brackets of the lateral extensions. With the pins extending through the flange and into the plate the lateral extensions are locked in their extended position. The gripping means allows a person to squeeze the pin members towards the center of the cylinders so as to release the pin members from engagement with the apertures or holes formed in the main body. The lateral extension can then be rotated 180° into their retracted position. The present invention also contemplates utilizing automatic (e.g., electromechanical) disengageable mechanical means.

The embodiment further comprises a powered roller assembly supported by the main body. The powered roller assembly including rollers and means for driving those rollers. The powered roller assembly includes means for raising the rollers to a position above the upper surface of the main body and into a position below the upper surface of the main body.

The first and second extension-retraction means of this embodiment preferably each include an elongated arm and a hydraulic member connected at one end to the arm and at an opposite end to the desk. The first and second arms are independently extendable and retractable away and towards the deck with the hydraulic members. One set of the upper and lower plates of the main body includes slots and the arm of the corresponding extension-retraction means extends in between the upper and lower plates and is slidingly fixed within the slot such that the arms are extendable away from the deck for different lengths so as to angle the main body.

The main body of the present invention includes a central axis extending between the first and second ends of the main body and the locking means are dimensioned and arranged such that the lateral extensions extend out essentially along the central axis of the main body when in the extended position and extend inwardly along an axis spaced and parallel to the central axis of the main body when the lateral extensions are in the retracted position.

The locking means for fixing the lateral extensions in place are dimensioned and arranged such that the lateral extensions pivot essentially 180° in passing between the extended position and the retracted position.

The extension-retraction means of the preferred embodiment include sliding means for sliding the arms within an elongated recesses formed in the deck. The arms and the corresponding recesses are dimensioned and arranged so as to limit the movement of the arms to sliding travel solely along the central axis of the elongated recesses. The arms thus stay transverse to the front end of the deck and angling of the main body is achieved by extending one arm further than the other while allowing one of the two arms to slide within the slots formed in the upper and lower plates.

Another embodiment of the present invention features an interface system which includes a deck structure and first and second extension-retraction means supported by the deck structure. A primary interface is supported by the first extension-retraction means such that the primary interface is movable by the first extension-retraction means between an extended position away from the deck structure and a retracted position closer to the deck structure. A secondary interface is supported by the second extension-retraction means such that the secondary interface is movable between an extended position away from said deck and a retracted position closer to the deck structure.

The first extension-retraction means includes a first primary arm connected at one end to the primary interface and a second primary arm connected at one end to the primary interface. The first primary arm is laterally spaced from the second primary arm. The second extension-retraction means includes a first secondary arm connected at one end to the secondary interface and a second secondary arm connected at one end to the secondary interface and laterally spaced from the first secondary arm.

The embodiment further includes first interplay means for interconnecting the primary arm and the first secondary arm and coordinating the movement of the first primary arm and the second primary arm. Second interplay means is also provided for interconnecting the second primary arm and the second secondary arm and coordinating the movement of the second primary arm and second secondary arm. The first and second interplay means are dimensioned and arranged such that, when the first and second primary arms of the first extension-retraction means are extended and retracted, the extension and retraction of the second extension-retraction means is coordinated so that the secondary interface is maintained intermediately positioned between a front edge of the deck structure and the primary interface.

The interface system of this embodiment has the primary and secondary interfaces each including a slotted recess with the first primary arm being slidably received within the slotted recess formed in the primary interface and the first secondary arm slidably received within the slotted recess formed in the secondary interface.

The first and second extension-retraction means are dimensioned and arranged such that uneven extension of one of the primary arms results in a tilting of the primary interface, and the first and second interplay means are dimensioned and arranged such that, when the primary interface is tilted, the secondary interface is tilted by essentially one-half the angle of tilt of the primary interface.

The first and second interplay means each include a pair of sprockets spaced along a respective secondary arm, a belt or chain in frictional contact around the pair of sprockets, means for connecting an adjacent primary arm to the belt or chain, and means to connect the belt or chain to the deck structure.

The secondary interface also includes at least one through-area and the primary arms are positioned laterally inside of the secondary arms so as to extend through the through-area or through-areas provided in the secondary interface and so as to be in frictional contact with the secondary interface. A preferred embodiment has the secondary interface formed as a rectangular frame structure with the primary arms extending within the interior of the rectangular frame structure.

BRIEF DESCRIPTION OF THE FIGURES

FIG. 4 shows a cut-a-way planar view of the interface system shown in FIG. 2 with both the primary interface and secondary interface in a retracted position;

FIG. 5 shows a cut-a-way planar view of the interface system shown in FIG. 2 with the primary interface and secondary interface in an extended position and, as exemplified by dashed lines, the primary and secondary interface set at an angle with respect to the end edge of the deck;

FIG. 5A shows a planar, cut-away view of the interface system having a modified securement means securing the secondary interface to the primary interface;

FIG. 13 shows a top plan view of the interface assembly shown in FIG. 12 with the lateral extensions retracted;

FIG. 14 shows a top plan view of that which is shown in FIG. 12;

FIG. 21 shows a planar, cut-away view of the extension-retraction means and interplay means for the interface assembly;

FIG. 22 shows a cross-sectional view taken along line II—II in FIG. 21;

FIG. 23 shows a cross-sectional view taken along line III—III in FIG. 21;

DETAILED DESCRIPTION OF THE PREFERRED EMBODIMENTS

Figure 1:
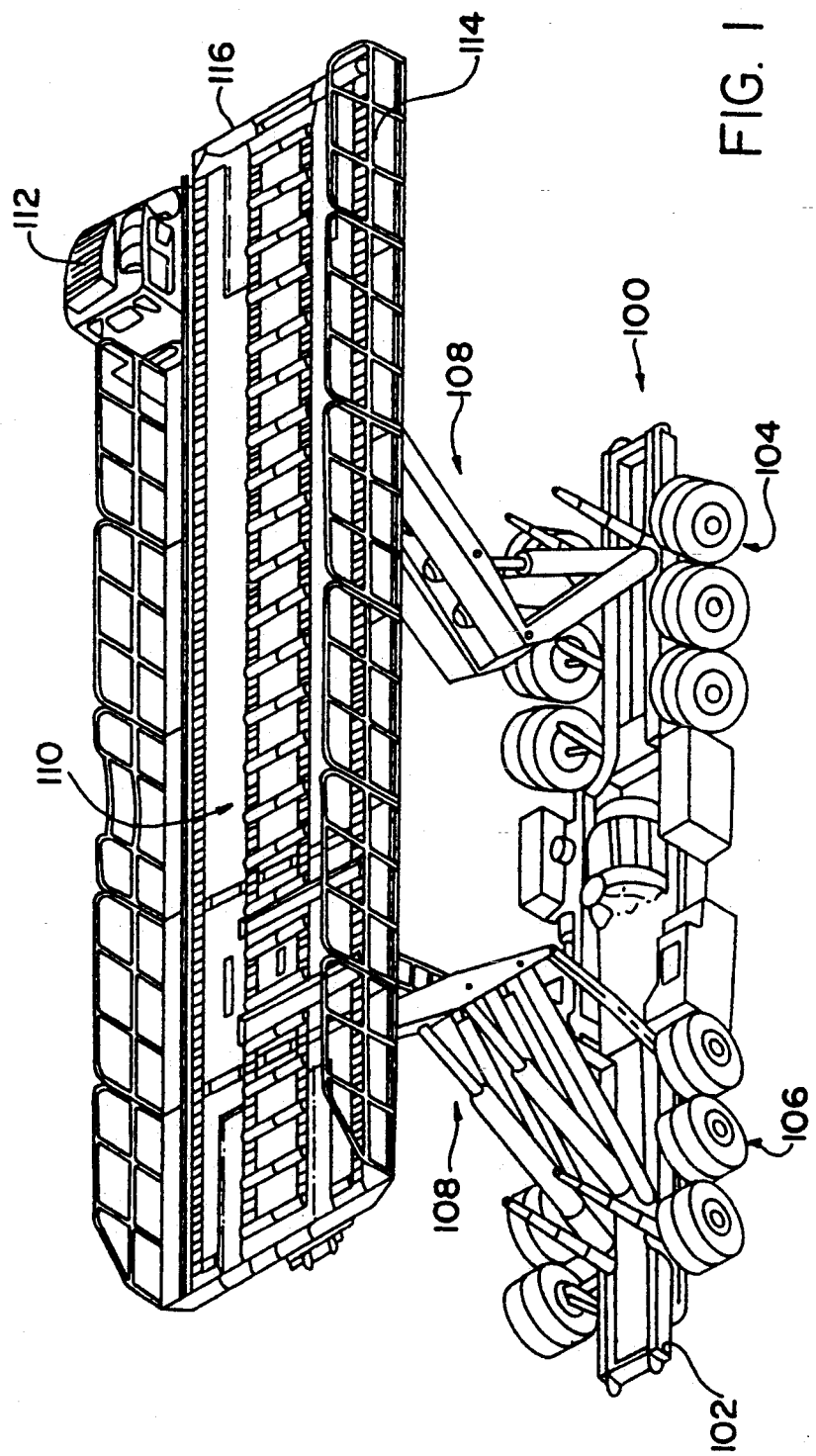
FIG. 1 shows a perspective view of a transport loader with one embodiment of the interface system attached therewith.

FIG. 1 shows a perspective view of an aircraft transport loader 100 having a base frame 102 supported by a set of steerable wheels 104 and a set of driving wheels 106. Main lift assembly 108 is secured to the under structure of deck 110. Deck 110 has operator's cab 112 secured on the left-hand side edge of deck front end 114.

Positioned at the forward edge of deck front end 114 is interface system 116.

Figure 2:
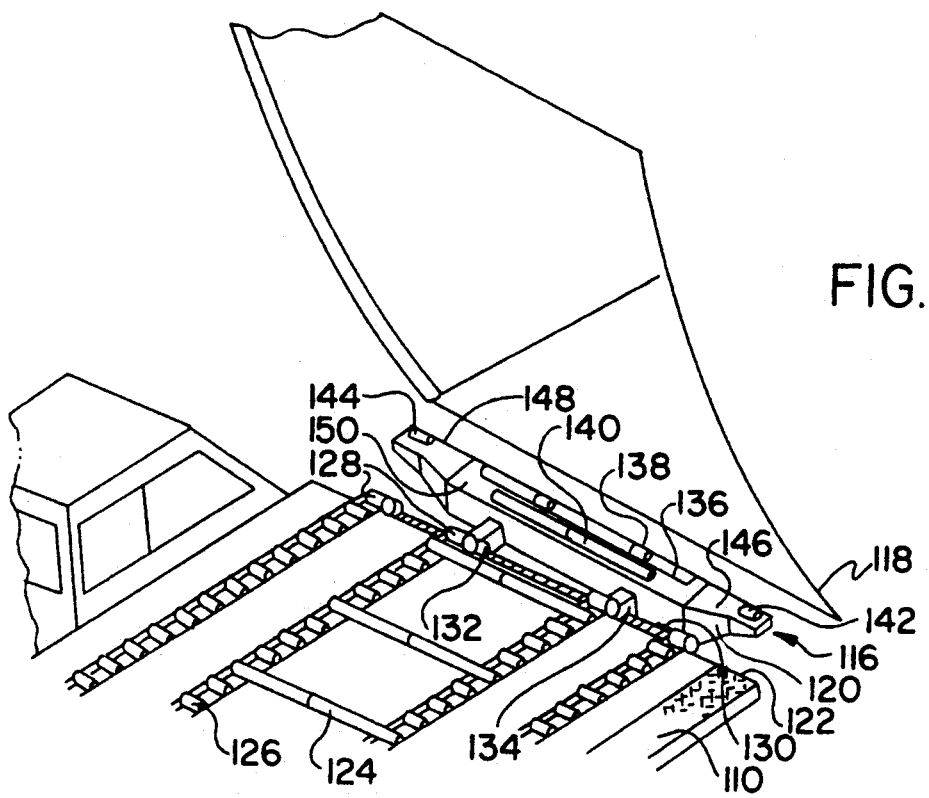
FIG. 2 shows a cut-a-way view of the front end of the transport loader's deck as well as a cut-a-way view of an aircraft cargo door.

FIG. 2 illustrates interface system 116 positioned between a cargo door frame 118 and deck 110. As there shown, primary interface 120 is positioned between aircraft door 118 and deck 110 from which it is supported. Deck 110 is shown to have a front edge 122 and both power rollers 124 and idler rollers 126 positioned along the deck's upper conveying surface. Deck 110 further includes spring loaded rollers 128 and bumpers 130.

Primary interface 120 includes support arms 132 and 134 which are secured in a sliding relationship to the under surface of deck 110. As shown in FIG. 2, by extending support arm 132 further out away from the front edge 122 of deck 110 than extension support arm 134, an angled orientation of primary interface 120 relative to the deck is possible. FIG. 2 further illustrates secondary interface 136 in its stowed position wherein secondary interface 136 is received within a corresponding recess or cutout formed in the front of primary interface 120. Secondary interface 136 can include idler rollers 138 while primary interface 120 features powered rollers 140 as well as its own idler rollers 142 and 144. Idler rollers 142, 144 are preferably positioned on the outboard ends of primary interface 120 and, more preferably, on the upper surface of lateral extensions 146 and 148 which extend outwardly off of main body portion 150.

Figure 3:
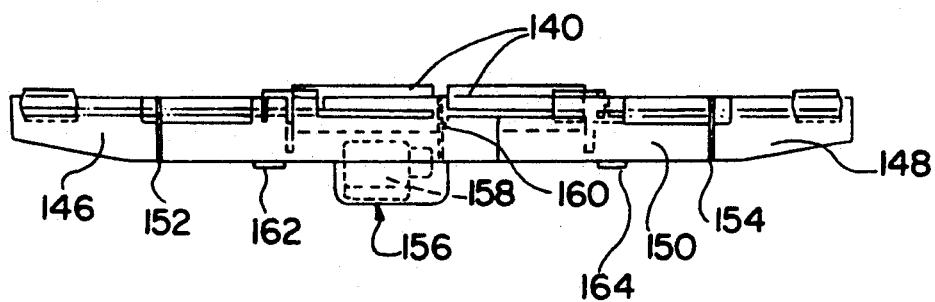
FIG. 3 shows a front end view of the interface system shown in FIG. 2.

FIG. 3 shows a front end view of interface system 116. As there shown, lateral extensions 146 and 148 are pivotably connected to main body portion 150 at hinge locations 152, 154, respectively. Positioned under power rollers 140 is power means 156 which includes an appropriate driving source such as an electric motor or hydraulic motor 158 together with an appropriate gearing or pulley system 160. FIG. 3 also reveals sensors 162 and 164 the purpose for which is discussed further below.

FIG. 4 illustrates a planar view of interface system 116 as well as a cut-a-way portion of deck 110. As shown in FIG. 4, a plurality of spring rollers 128 extend out from front edge 122 of deck 110 towards the inside surface of primary interface 120. Spring loaded rollers 128 are adapted for compression situations such as where primary interface 120 is retracted against bumpers 130. Support arms 132 and 134 are shown slidingly received within guide extension channel members 166 and 168 which can be supported by the under surface of deck 110. Hydraulic cylinders 170 and 172 are shown positioned adjacent guide extension channel members 166, 168. Hydraulic cylinders 170 and 172 can also be secured to the under structure of deck 110. FIG. 4 further illustrates secondary interface 136 as well as the extension-retraction means for the secondary interface which comprises link assemblies 174 and 176. As shown in FIG. 4, each link assembly includes a pair of link members adapted to be placed in a folded arrangement when secondary interface 136 is nestled within cutout 178 formed in primary interface 120.

FIG. 5 illustrates in planar view both secondary interface 136 and primary interface 120 in an extended position with respect to deck 110. FIG. 5 further illustrates, in dashed lines, the maximum angle adjustment made possible by extending one extension member to a greater extent than the other. FIG. 5 shows support arms 132 and 134 extending out away from front edge 122 of deck 110. The extension of support arms 132 and 134 is made possible by extending rods 180 and 182 which form a part of hydraulic cylinders 170 and 172

(FIG. 4). The ends of rods 180 and 182 are pivotably connected to brackets 184 and 186. Brackets 184 and 186 also include means for pivotably securing the forwardmost ends of support arms 132 and 134. In addition, bracket members 184 and 186 are secured to main body 150 of primary interface 120. The pivotal relationship between brackets 184, 186 and corresponding cylinder rods 180 and 182 as well as the pivotal relationship between brackets 184, 186 and extension support arms 132 and 134 makes it possible for angle adjustments to be made to the primary interface 120 as illustrated in the dashed lines in FIG. 5. The maximum angle of adjustment is represented by angle X which in a preferred embodiment is about 15 degrees. Although primary interface 120 is shown angled towards the right front end of deck 110, a similar angle adjustment can be made in an opposite, counterclockwise, direction. The notched recesses provided at the ends of lateral extensions 146 and 148 avoids premature abutment when primary interface is being angularly adjusted. The extension-retraction means between primary interface 120 and deck 110 and the extension-retraction means between primary interface 120 and secondary interface 136 each preferably has a maximum extension of about one foot.

FIG. 5 illustrates link assemblies 174 and 176 which each include a first link member 188 and a second link member 190 at the other end. Link members 188 are pivotably connected to primary interface 120 at one end and to a corresponding link member 190 at their other end. Link members 190 are secured at their other end to secondary interface 136*. Link members 188 and 190 can be locked in an extended position by appropriate locking means such as a locking pin extending through an aperture being in both link members 188 and 190 with the aperture formed a short distance away from the pivot connection between link members 188 and 190. FIG. 5 also illustrates sensor 192 the purpose for which is described further below.

FIG. 5A illustrates an alternate embodiment of the invention wherein secondary interface 136' is positioned adjacent primary interface 120'. The elements in common with those shown in FIG. 4 have been designated with equivalent dashed numbers. FIG. 5A further reveals the replacement of link assemblies 174 and 176 with a hydraulic system featuring a right hydraulic assembly 300 and a similar left hydraulic assembly (not shown). Hydraulic assembly 300 includes tubular guide 301 and slide member 302 slidingly received within tubular guide 301. Slide member 302 is pivotably attached at 307 to pivot support 303 which is attached to secondary interface 136. Pivot support 303 is also pivotably attached to rod 305 of hydraulic member 306. Hydraulic member 306 is preferably secured to the under surface of primary interface 120'.

Figure 9:
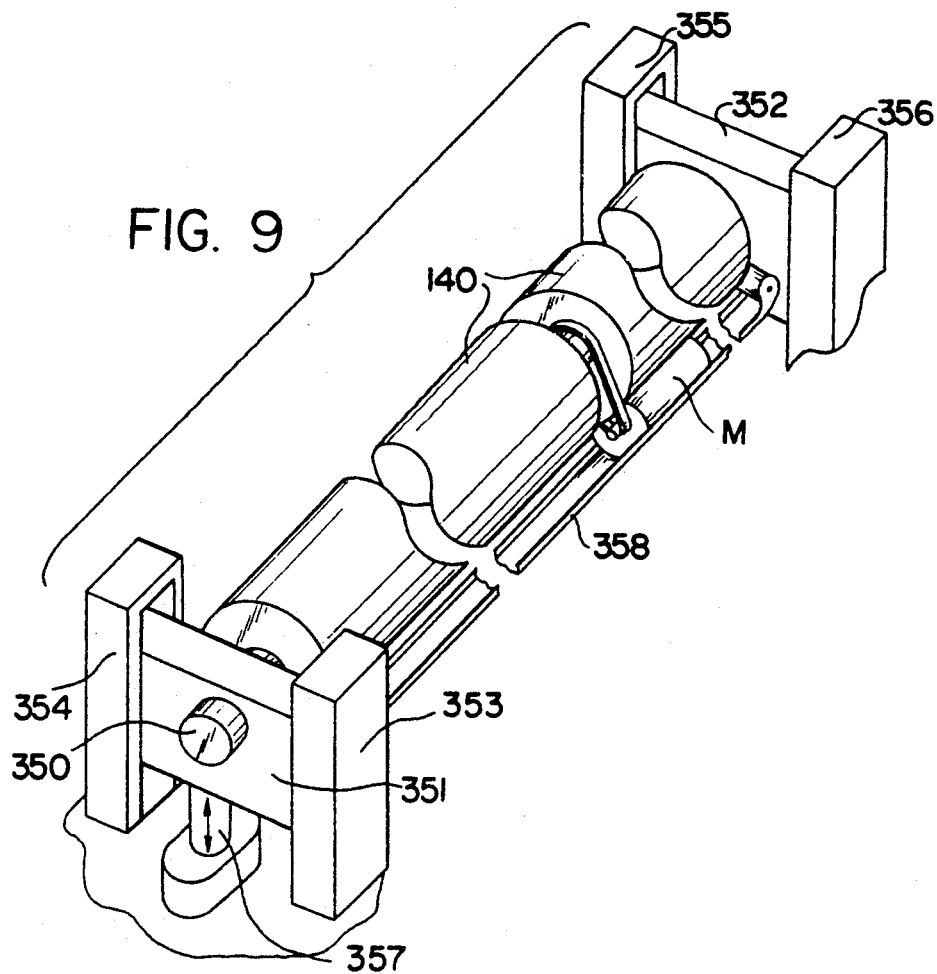
FIG. 9 shows, in cut-away, a perspective view of the powered rollers of the present invention.

FIG. 5A also illustrates rollers 308 in secondary interface 136' which are preferably powered either by a source attached to the under surface of secondary interface 136' (not shown) or through the same driving means used for powered rollers 140 which is shown in FIG. 9 and discussed further below.

Figure 6:
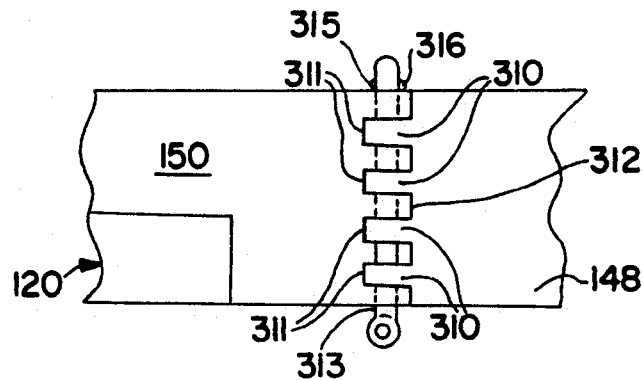
FIG. 6 shows a planar cut-a-way view of an outboard end of the primary interface with the lateral extension locked in an extended position.
Figure 6A:
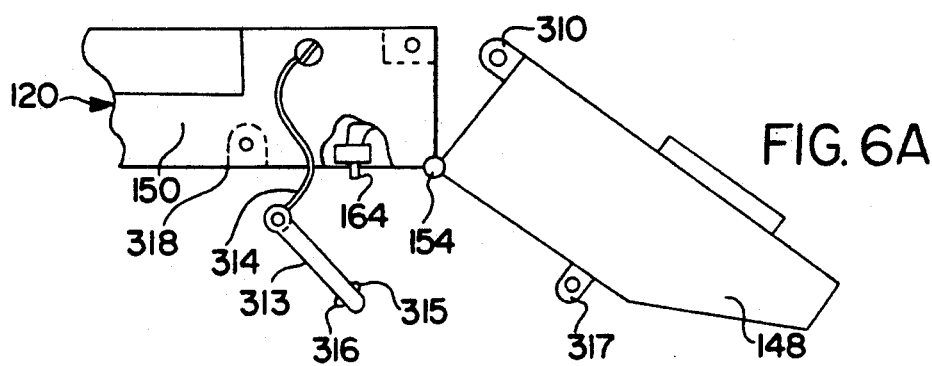
FIG. 6A shows an elevational, cut-away view of an outboard end of the primary interface having an unlocked and partially rotated lateral extension.
Figure 6B:
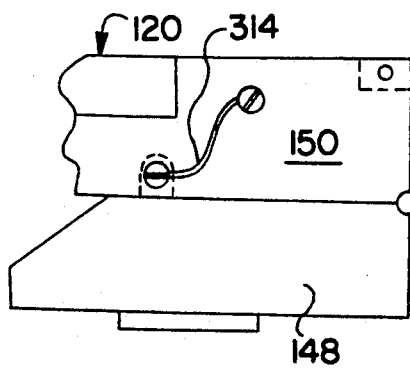
FIG. 6B shows the arrangement of FIG. 6A except for the lateral extension being fully rotated and locked into a second position below the main body portion of the primary interface.

FIGS. 6, 6A and 6B illustrate lateral extension 148 in pivotal connection with main body portion 150 of primary interface 120. The pivotal relationship between lateral extension 148 and main body portion 150 is made possible by hinge connection 154. As it is required to reduce the transverse width of primary interface 120 for certain aircraft cargo door frame sizes, lateral extension 148 is made positionable in one of two locations. The first location is when the lateral extensions extend outwardly as shown in FIG. 3-5 and FIG. 6. The second location is when the lateral extensions are locked in the manner illustrated in FIG. 6B.

As further shown in FIGS. 6, 6A and 6B, lateral extension 148 is formed with a plurality of upper insert members 310. Main body portion 150 has formed therein a plurality of upper recesses 311 for receiving insert members 310. Recesses 311 are defined by upper extensions 312 formed at the end of main body portion 150. Both upper extensions 312 and upper insert members 310 have an aperture formed therein for receipt of pin 313 when insert members 310 are received within recesses 311. FIG. 6 illustrates the arrangement wherein pin 313 locks insert members 310 in position within recesses 311.

Locking pin 313 is connected to main body portion 150 by lanyard 314. Positioned at the end of locking pin 313 is a pair of spring biased locking balls 315, 316 which prevent locking pin 313 from inadvertently sliding out from a locking position.

FIG. 6A illustrates the unlocking of insert members 310 from recesses 311 and rotation of lateral extension 148 to an intermediate position between the first locking position as shown in FIG. 6 and the second locking position as shown in FIG. 6B.

FIGS. 6A and 6B illustrate lower insert members 317 (one shown) which are received in lower recesses 318 in a manner similar to that described for the first locking position. As shown in FIG. 6B, once lower inserts 317 are inserted within recesses 318 and the apertures in each are aligned, pin 313 can be inserted to fix lateral extension 136 in the second locking position.

FIG. 6A also shows sensor 164 which detects whether lateral extension 148 is in the first or second locking position. As previously noted, in a preferred embodiment, if secondary interface 136 is in its extended position, primary interface 120 can only be extended out away from deck 110 when lateral extensions 146 and 148 are in the second locking position below main body portion 150. Sensor 164 thus provides an indication that lateral extension 148 is in its proper position such that hydraulic cylinder 172 can be extended. A similar arrangement is provided on the opposite side. Sensor 192 shown in FIG. 5 provides a means to determine whether secondary interface 136 is extended or remains in a stowage position. Various other means for releasably locking lateral extension 146 and 148 in the first and second locking positions are also contemplated although the above described arrangement is preferred.

Figure 7A:
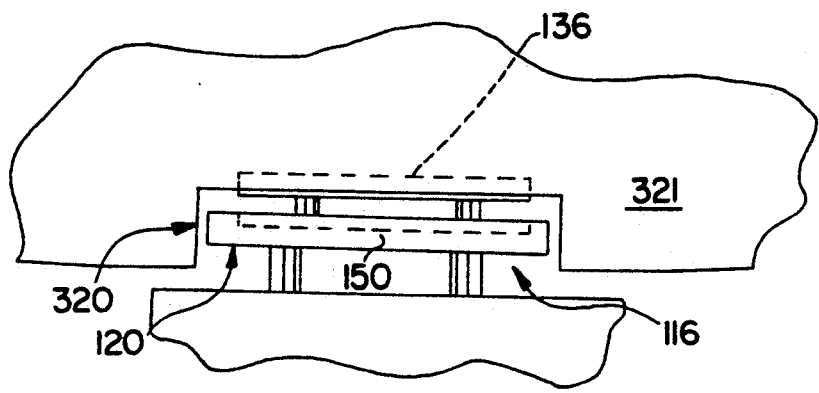
FIG. 7A shows a planar cut-away view of the interface system being used with an airplane having a recessed door sill.
Figure 7B:
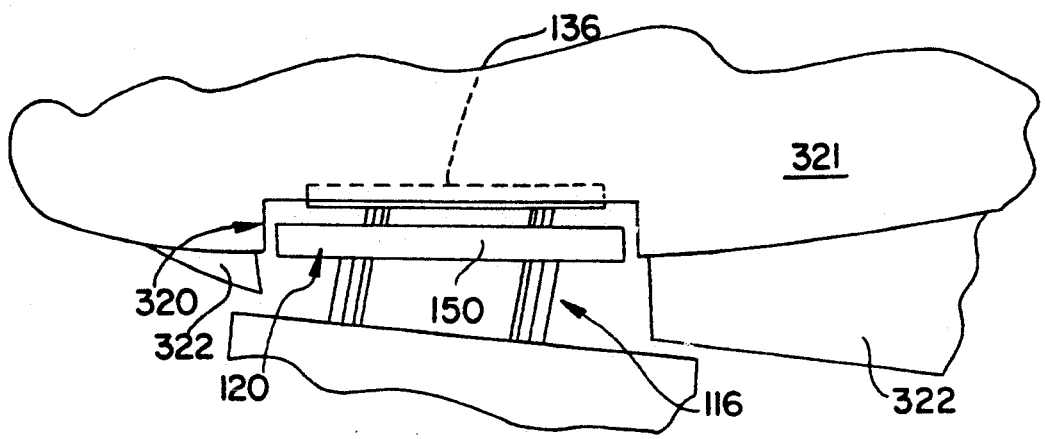
FIG. 7B shows a planar cut-away view of the interface system having angularly adjustable primary and secondary interfaces in operation with respect to an airplane having a recessed door sill and a wing fillet.

FIGS. 7A and 7B illustrate an extended primary interface 120 with lateral extensions 146 and 148 in the second locking position and an extended secondary interface 136. More particularly, FIG. 7A illustrates the relationship between interface system 116 and the lower deck cargo door 320 of aircraft 321, such as a 747 or a DC-10 aircraft, recessed within the outer skin of the aircraft. FIG. 7B illustrates an aircraft having a wing fillet 322 with a recessed area for access to cargo door 320. Detectors 162 and 164 would prevent extension of secondary interface 136 until after lateral extensions 146 and 148 are placed in the second locking position. If it was possible to extend secondary interface 136 without lowering lateral extensions 146 and 148, then the operator could inadvertently extend primary interface 120 to reduce the gap and damage the skin and/or fillet of the aircraft. With the secondary interface retracted, however, it is possible to extend the primary interface with lateral extensions 146, 148 in the first locking position such that primary interface 120 can be aligned with wider door openings of the aircraft such as the 104 inch cargo door in FIG. 2. FIG. 7B also illustrates the use of extension-retention members such as those shown in FIG. 5A to secure the secondary interface to the primary interface such that the secondary interface can be varied in angular position with respect to the primary interface. In a preferred embodiment both the primary and secondary interface can be angularly adjusted. The present invention also contemplates making only one of the two interfaces angularly adjustable.

Figure 8A:
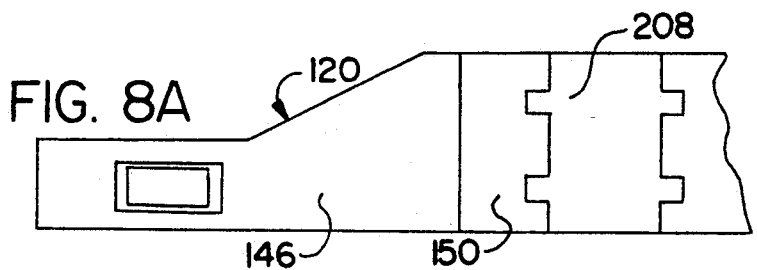
FIG. 8A shows a planar, cut-away view of the outboard end of the primary interface which has a notched passageway formed therein.

FIG. 8A illustrates notched passageway 208 formed in main body portion 150 of primary interface 120. A notched passageway, similar to notched passageway 208, is provided on the opposite side of power rollers 140 and is spaced to match the transverse spacing of forklift truck tines. These notched passageways enable the operator of a forklift truck to easily slide the forklift tines between a heavy cargo container and the upper surface of the primary interface so as to facilitate the dropping off or picking up of a container.

Figure 8B:
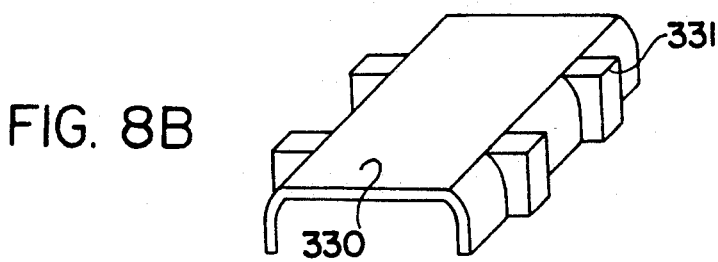
FIG. 8B shows a perspective view of a cover insertable within the notched passageway.
Figure 8C:
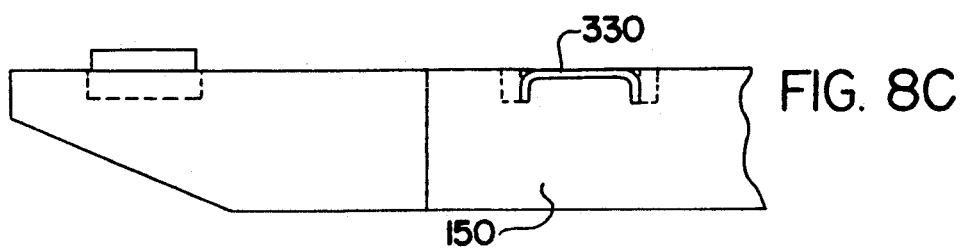
FIG. 8C shows an elevational view of the cover in position within the notched passageway.

FIG. 8B illustrates cover 330 with protrusions 331 positioned for releasably retaining cover 330 in position within notched passageway 148 as shown in FIG. 8C. With cover 330 in position an essentially complete upper planar surface is provided so as to facilitate manual sliding of containers along the upper surface of primary interface 120. Covers 330 are removed and stored when the notched passageways are in use.

FIG. 9 illustrates power rollers 140 removed from their recessed position within main body portion 150 for the sake of clarity. As shown, power rollers 140 include a shaft 350 which is received at its ends within bearing support members 351 and 352. Bearing support member 351 is slidingly retained within grooved blocks 353 and 354. Likewise, bearing support member 352 is slidingly retained within grooved blocks 355 and 356. Hydraulic means 357 (one shown) are positioned below bearing support members 351 and 352 for enabling variations in the height of the upper surface of the rollers with respect to main body portion 150.

Driving means M, which could include an electric or hydraulic motor coupled with engagement means is drivingly engaged with shaft 152. To retain driving means M in position while rollers 140 are varied in height, bracket support 358 is secured at its ends to bearing support members 351 and 352. Preferably, power rollers 140 are adjustable to a first position wherein an upper surface of power rollers 140 is above the upper surface of main body portion 150 and into a second position where the upper surface of power rollers 140 is either flush or below the upper surface of main body portion 150. A similar arrangement as that described above could be utilized for driving rollers 308 in FIG. 5A.

Figure 10:
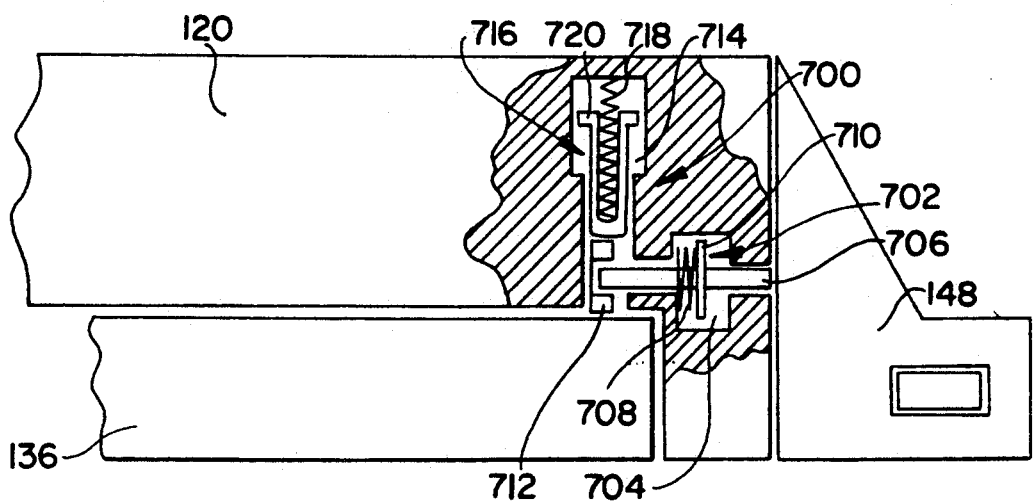
FIG. 10 shows a partially cut-away, planar view of a mechanical latch assembly suitable for preventing extension or retraction of the secondary interface.

FIG. 10 shows a partially cut-away, planar view of the mechanical latch assembly 700 supported within primary interface 120. Mechanical latch assembly 700 includes first preventing means 702 which comprises cavity 704 and pin member 706 biased outward by spring 708. Spring 708 is attached to flange 710 at one end and to a wall of cavity 704 at the other end. When a lateral extension (e.g., 148) is in an up position, pin member 706 is forced inwardly into reception means 712 which is secured to secondary interface 136. When lateral extension is placed in a down position, spring 708 forces pin 706 outwardly and out of engagement with reception means 712 leaving secondary interface free for extension.

Reception means 712 is received within recess 714 forming part of second preventing means 716 which also includes spring member 718 and plate member 720. When lateral extension 148 is down and secondary interface 136 is extended, plate 720 is biased forward to fill a portion of the recess and prevent pin member 706 from engaging with reception means 712.

Figure 11:
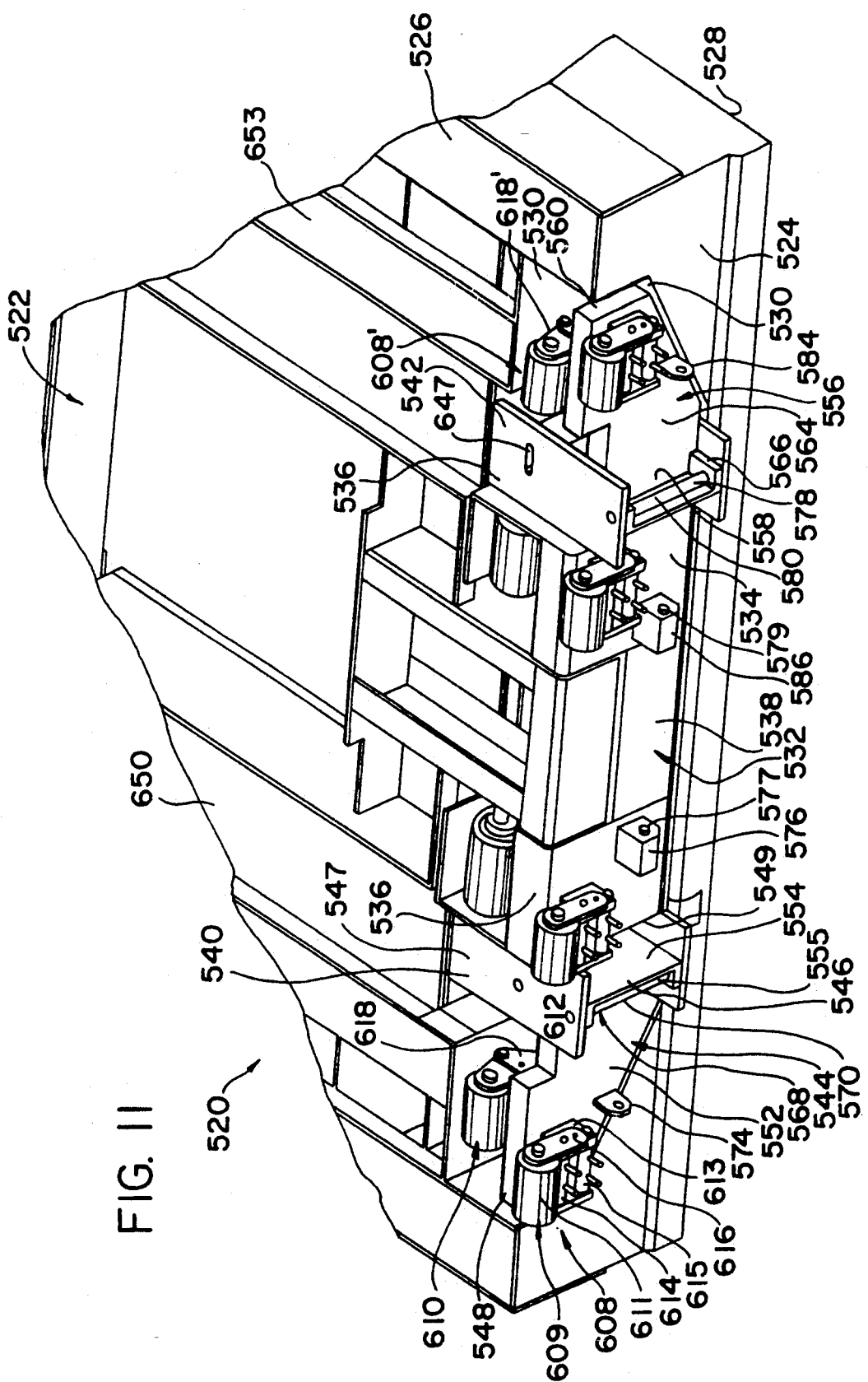
FIG. 11 shows a perspective view of another embodiment of the invention in stowage mode with respect to a supporting deck and with lateral extensions fully suspended.

FIG. 11 shows a cut-away perspective view of another embodiment of the present invention which features interface system 520. Interface system 520 includes deck 522 having front end 524, upper surface 526, and lower surface 528. Deck 522 also features a stowage compartment 530 which is dimensioned to receive within its confines interface assembly 532 while the below described lateral extensions are extended.

Interface assembly 532 includes main body 534, upper surface 536 and lower surface 538. Main body 532 also includes first end 540 and second end 542.

Extending outwardly away from first end 540 of main body 534 is first lateral extension 544. First lateral extension 544 is comprised of support beam 552 which is joined to bracket member 554. As illustrated, bracket 554 is C-shaped in cross section and extends transversely at the interior end of support beam 552 to opposite sides of support beam 552. As further shown in FIG. 11, first lateral extension 544 includes a first interior end 546 and a second exterior end 548.

Second lateral extension 556 extends out away from second end 542 of main body 534. Second lateral extension 556 features support beam 564 which is joined at a first end 558 to bracket member 566. Bracket member 566 extends to opposite sides of support beam 564. Bracket members 554 and 566 are pivotably secured to main body 534 in a manner described in more detail below.

Figure 12:
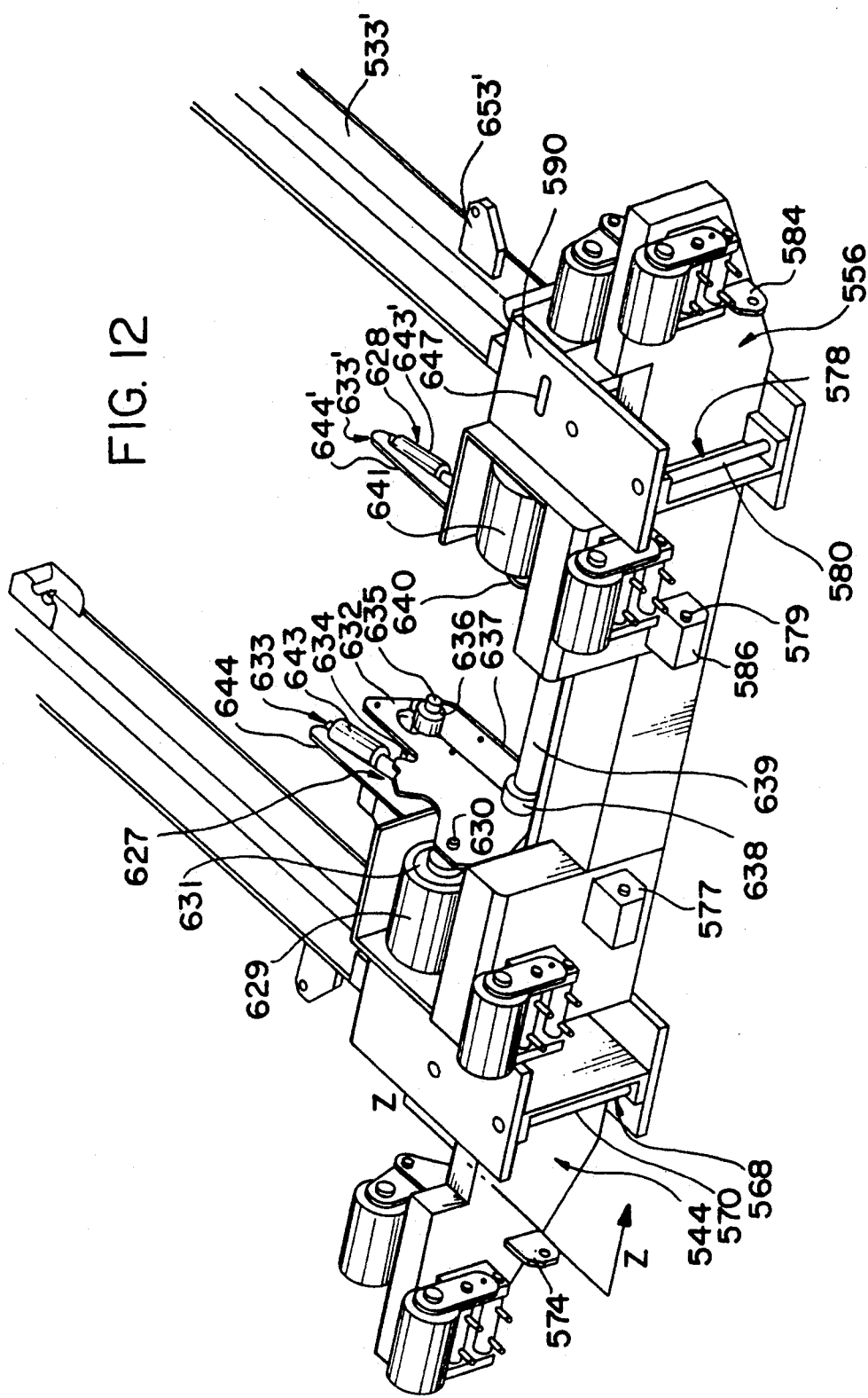
FIG. 12 shows the interface system of FIG. 11 with the deck structure removed for clarity.

FIGS. 11 and 12 illustrate lateral extensions 544 and 556 in their extended position. First lateral extension 544 is fixed in its extended position by way of first locking means 568. Second lateral extension 556 is fixed in its extended position by way of second locking means 578.

Figure 17A:
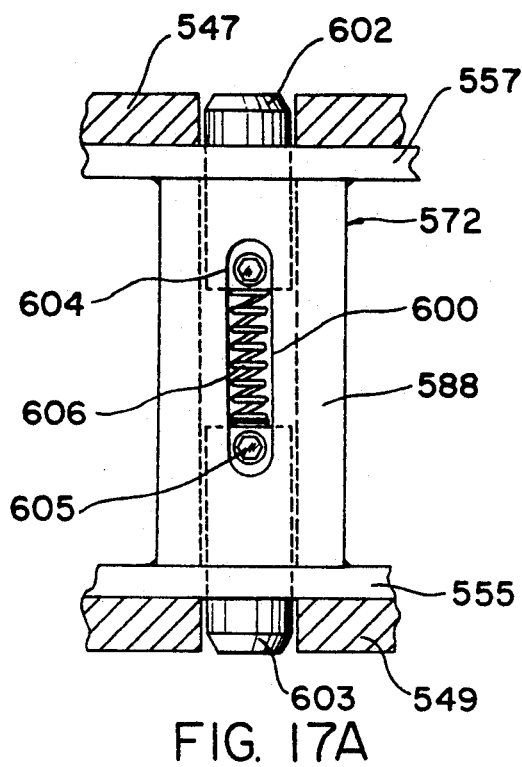
FIG. 17A illustrates a lock pin assembly.
Figure 17B:
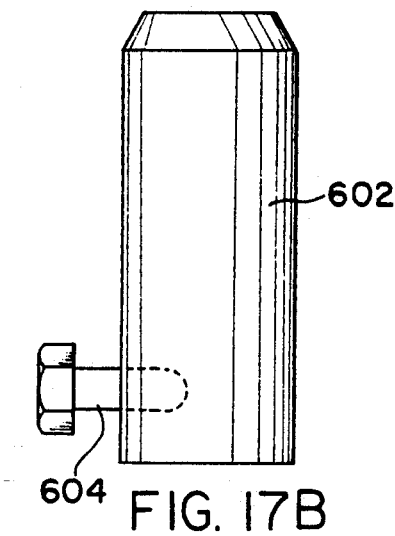
FIG. 17B illustrates one of the lock pins of the lock pin assembly shown in FIG. 17A.
Figure 18A:
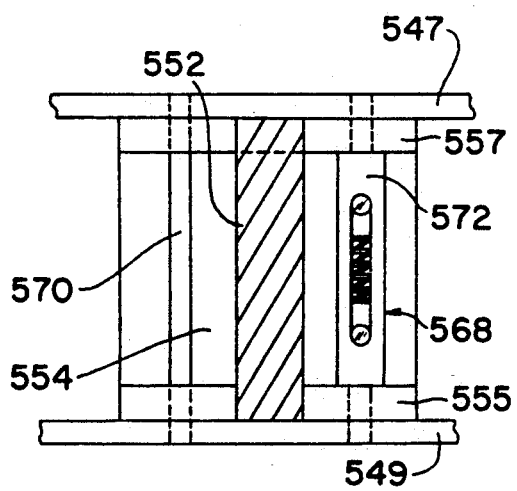
FIG. 18A shows a cut-away view taken along Z—Z in FIG. 12.
Figure 18B:
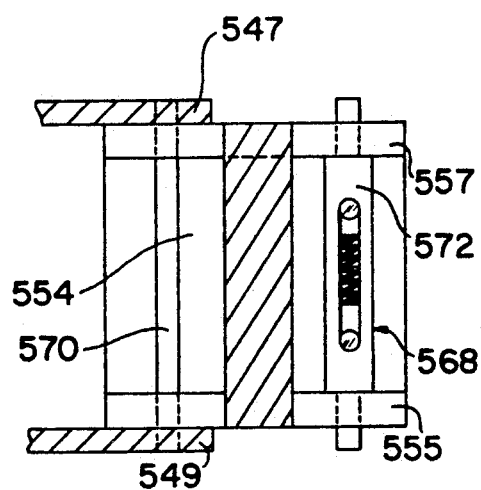
FIG. 18B shows a cut-away view taken along line X—X in FIG. 13.

With reference to FIGS. 11, 12, 17a, 17b, 18a, and 18b, the function of first and second locking means 568, 578 is provided below. As shown in FIG. 11, first lateral extension 544 has its bracket member 566 pivotably secured between upper plate 547 and lower plate 549 of main body 534 by way of pivot pin 570. As shown in FIGS. 18A and 18B, pivot pin 570 extends through both upper flange 557 and lower flange 555 of bracket member 554. Also, pin 570 extends into aligned holes or recesses formed in upper plate 547 and lower plate 549 and is preferably fixed at its ends to the upper and lower plates 547 and 549. FIGS. 18A and 18B also illustrate first locking means 568 which includes disengageable engagement member 572 and the aforementioned pivot pin 570. Support beam 552 of first lateral extension 544 extends transversely out away from bracket member 554 and includes an upper and lower shoulder to accommodate upper and lower flanges 555 and 557 (see FIG. 11). Support beam 552 is positioned mid-way between disengageable engagement member 572 and pivot pin 570 along bracket member 554.

FIGS. 17A and 17B illustrate in greater detail disengageable engagement member 572 shown in FIGS. 18A and 18B. FIG. 17A illustrates disengageable engagement member 572 as including cylinder 588 fixedly retained between flange members 555 and 557. Cylinder 588 includes an axially extending slot 600 extending from the exterior of cylinder 588 into the hollow interior of cylinder 588. Engagement pin 602 and 603 are dimensioned and arranged so as to axially slide within the hollow interior of cylinder 588 as well as the aligned holes formed in flange members 555 and 557. Also, when the disengageable engagement member 572 is in an engaged state, engagement pins 602 and 603 extend through the aligned holes formed in upper plate 547 and lower plate 549. The external ends of engagement pin 602 and 603 are beveled for easy insertion with the aligned holes in the upper and lower plates. Spring 606 is positioned between the interior ends of engagement pin 602 and 603 and biases engagement pin 602 and 603 in an outward direction. Engagement pins 602 and 603 also feature gripping means 604 and 605 extending away from the exterior of engagement pin 602 and 603 and designed for extension through slot 600.

In a preferred embodiment, gripping means 604 are bolts threaded into the side of engagement pin 602 and 603 near the interior end of the engagement pins. Disengageable engagement member 572 is thus arranged such that gripping means 604 and 605 can be drawn towards one another against the force of spring 606 so as to remove the exterior ends of engagement pins 602 and 603 from engagement with upper and lower plates 547 and 549. This action releases lateral extension 544 such that it may be pivoted from its extended position to a retracted position as explained in greater detail below. The arrangement for locking in position second lateral extension 556 is the same as that for first lateral extension 544 and thus further description would be redundant.

FIG. 13 illustrates lateral extensions 544 and 556 in their retracted position and FIG. 14 illustrates the lateral extensions in their extended position. A discussion of the movement of the lateral extensions between their retracted and extended position will be made with regard to first lateral extension 544 only as the positioning and movement of the second lateral extension 566 is essentially the same with respect to the surrounding upper and lower plate and second end of main body 534. As shown in FIG. 13, when first lateral extension 544 is in its retracted position, bracket 554 extends out away from the front end of plates 547 and 549. The rear end of bracket 554 is retained in fixed relationship with respect to plate members 547 and 549 by way of pivot pin 570. Pivot pin 570 forms a component of the aforementioned locking means 568. As noted above, the forward most end of bracket member 554 includes disengageable engagement means 572 which in FIG. 13 is shown in its unengaged state such that pin 602 extends out above bracket member 554 (see FIG. 18A taken along line X—X in FIG. 13). In the retracted position, support beam 552 is positioned so as to extend in front of main body 534 with its second end 548 directed towards second end 542 of main body 534. The support beam is spaced from the forwardmost end of plate 547 a distance equal to about ¼ of the total bracket length. Also, main body 534 includes a central, forward recess 648 from which beam 552 is even further spaced. Also, support beam 552 extends essentially parallel to the central axis of main body 534 which extends between ends 540 and 542.

Figure 15:
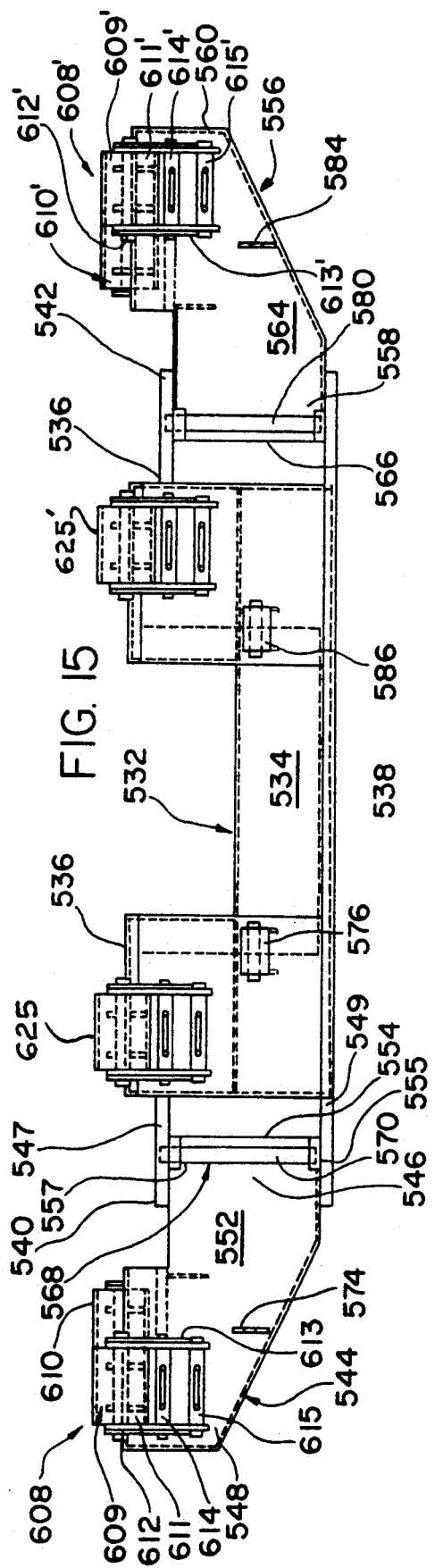
FIG. 15 shows a front elevational view of that which is shown in FIG. 12.

When lateral extensions 544 and 556 are in their retracted position, interface system 520 is well suited for the loading and unloading of cargo in smaller width cargo areas, such as the smaller cargo bays found on some aircraft. To maintain lateral extensions 544 and 556 in their retracted position, a lock assembly is relied upon. There is a lock assembly associated with each of the lateral extensions. As shown in FIGS. 11, 12 and 15 each lock assembly includes a protruding first lock member 574, 584 which, in a preferred embodiment, constitutes a forwardly extending plate secured to one side of a corresponding support beam 552, 564. Each lock assembly also comprises housings 576 and 586 with internally spring-loaded engagement pins 577 and 579 located on the front face of main body 532. With reference to FIG. 14, housings 576 and 586 are positioned such that pins 577 and 579 engage with corresponding holes formed in first lock members 574 and 584 when the lateral extensions are retracted. Pins 577 and 579 also preferably feature gripping means (not shown) for achieving disengagement of pins 577 and 579 from plates 574 and 584. Alternatively, pins 577 and 579 can be mechanically or electronically driven by, for example, a solenoid.

When it is desirable to use the interface system 520 for relatively large cargo bays, first and second lateral extensions 544, 556 are moved from their retracted position (FIG. 13) to their extended position (FIG. 14). In so doing, pins 577 and 579 are shifted out of engagement with lock members 574, 584. Lateral extensions 544 and 556 are then shifted essentially 180° about their respective pivot axis (central axis of pivot pins 570 and 580) so as to be in the position illustrated in FIG. 14.

To maintain lateral extensions 544 and 556 in an extended position, the disengageable engaging means of each lateral extension (e.g. 572 in FIG. 18a) is activated so as to have the outwardly extending pins (e.g. 602 and 603, FIG. 18a) extend through the upper and lower plates (e.g. 547 and 549) and lock the lateral extension in their extended positions.

FIGS. 13 and 14 also illustrate first extension-retraction means 531 and second extension-retraction means 537 positioned to one side of first extension-retraction means 531. The components of extension-retraction means 537 corresponding with those of extension-retraction means 533 are indicated in FIGS. 13 and 14 with like references numbers that are primed. As shown, extension retraction means 531 comprises extension arm 533 having a first end 649 which is maintained, during the operation of extension-retraction means, in sliding compartment 650 (FIG. 11). Extension arm 533 includes second end 651 pivotably secured between upper and lower plates 547, 549 of main body 534. Connector member 653 is secured to arm 531 at one end and secured (e.g. pivotably) to hydraulic cylinder 655 at its other end. Hydraulic cylinder 655 is secured (e.g. pivotably) at end 657 to a rigid portion of deck 522 such that arm 531 can be independently extended and retracted by hydraulic member 655. A similar arrangement is provided for extension-retraction means 537.

As noted, extension-retraction means 533 and 537 are extendable and retractable independent of one another. Thus, main body 532 can be angled by extending or retracting one extension-retraction means further than the other. Swing slot 647 is provided in upper plate 590 and a similarly shaped end positioned slot (not shown) is formed in lower pate 592. Pin member 647' is slidingly retained within the swing slots 647 and passes through end 651' of arm 533' so as to enable the angling of main body 532.

Figure 16:
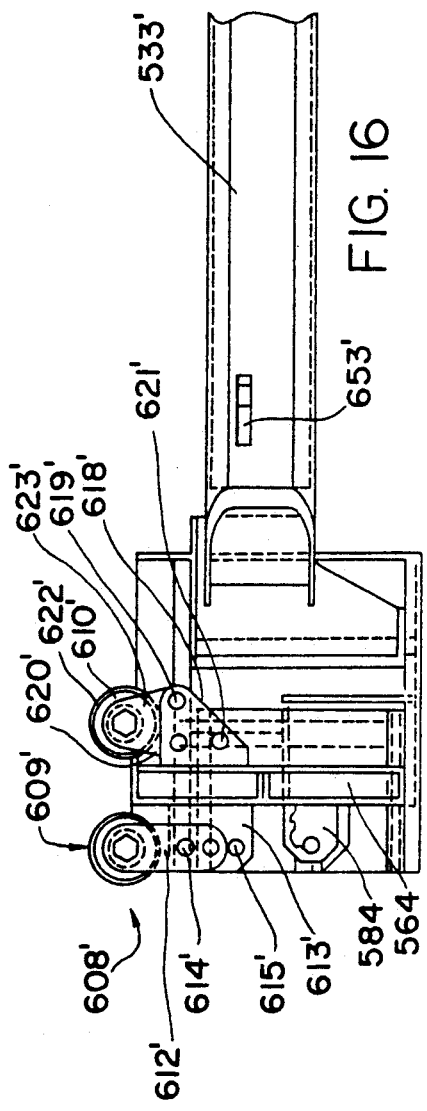
FIG. 16 shows a side elevational view of that which is shown in FIG. 15.

FIGS. 11, 15 and 16 illustrate first exterior roller system 608 mounted on first lateral extension 544. First exterior roller system 608 includes first roller assembly 609 and second roller assembly 610 which are mounted on opposite sides of support beam 552. First roller assembly 609 includes roller 611 pivotably supported on lever assembly 612. First support bracket 613 extends from one side of beam 552 and supports roller 611 and lever assembly 612. To maintain lever assembly 612 and roller 611 in position with respect to support bracket 613, a pair of disengageable engagement members 614 and 615 are provided.

Engagement member 614 includes spring biased pins similar to those previously discussed in FIG. 17A. Engagement member 614 is activated to insert the spring biased pins associated therewith through aligned holes in lever assembly 612 to lock roller 611 in an up position. When the roller is to be placed in a down or retracted position, engagement member 614 is disengaged such that lever assembly is free to pivot about pivot members 616 and 617 (FIG. 14). Once in its down position, engagement member 615 is activated so as to insert pins through the aligned holes in lever assembly 612 previously occupied by the pins of engagement member 614.

With reference to FIGS. 15 and 16, an exterior roller system 608' is shown which is similar to exterior roller system 608 and shows like components with equivalent dashed reference numbers. FIG. 16 represents a side view of that which is shown in FIG. 15 and thus together with FIG. 11 provides a good illustration of second exterior roller assembly 610' which includes bracket 618' supported by support beam 564 and lever 623'. Lever 623' pivotably supports roller 622' and is pivotably joined to bracket 618' by pivot pin 620'. Engagement member 619' (similar to arrangement of 614 and 615) extends through aligned holes in bracket 618' to maintain roller 622' in the illustrated up position. To place roller assembly 610' in a down position, engagement member 618' is disengaged and lever 623' pivots down, until the pins of engagement member 618' line up with holes 621' formed in bracket 618'.

FIG. 15 illustrates interior roller assemblies 625 and 625' mounted on main body 534. Interior roller assemblies 625 and 625' are arranged on main body 534 in the same fashion as that described for first roller assemblies 609 and 609' which are mounted on the lateral extensions.

FIG. 12 illustrates first power roller assembly 627 and second power roller assembly 628. First power roller assembly 627 includes power roller 629 having axle 630 with gear 631 fixed thereto. Axle 630 is retained at one end within a notch formed in bracket 632 and at its other end in an aperture formed in main body 534. Bracket 632 is pivotably secured to hydraulic system 633 which includes hydraulic cylinder 643 and fixed extension 644 which is supported by the deck structure at one end and pivotably supports hydraulic cylinder 643 at its opposite end. Bracket 632 also supports motor 634 with driving shaft 635 and gear 636.

Chain 637 extends to gear 638 formed on shaft 639. Shaft 639 pivotably supports bracket 632 and has its adjacent end rotatably supported by main body 534. Shaft 639 supports an additional gear (not shown) on the opposite side of bracket 632 which is in driving engagement with gear 631 by way of a chain or intermediate gears (not shown).

Shaft 639 extends along a recess formed along the length of main body 534 and is rotatably supported at its opposite end by main body 534. Shaft 639 also supports at its opposite end bracket 640. Power roller 641 has a central axle (not shown) supported at one end by bracket 640 and at its opposite end by main body 534. A second hydraulic system 633' is provided and has hydraulic cylinder 643' and extension 644' similarly arranged to that of hydraulic system 633.

Shaft 639 includes a gear (not shown) at its end supported by bracket 640 which powers roller 641 through the output of motor 643 supported on bracket 632.

By extending hydraulic cylinders 643 and 643', brackets 632 and 640 pivot about shaft 639 to raise rollers 629 and 641 into a lifted, operating position and, by retracting hydraulic cylinder, rollers 629 and 641 are placed in a lowered, stowage mode.

Figure 19A:
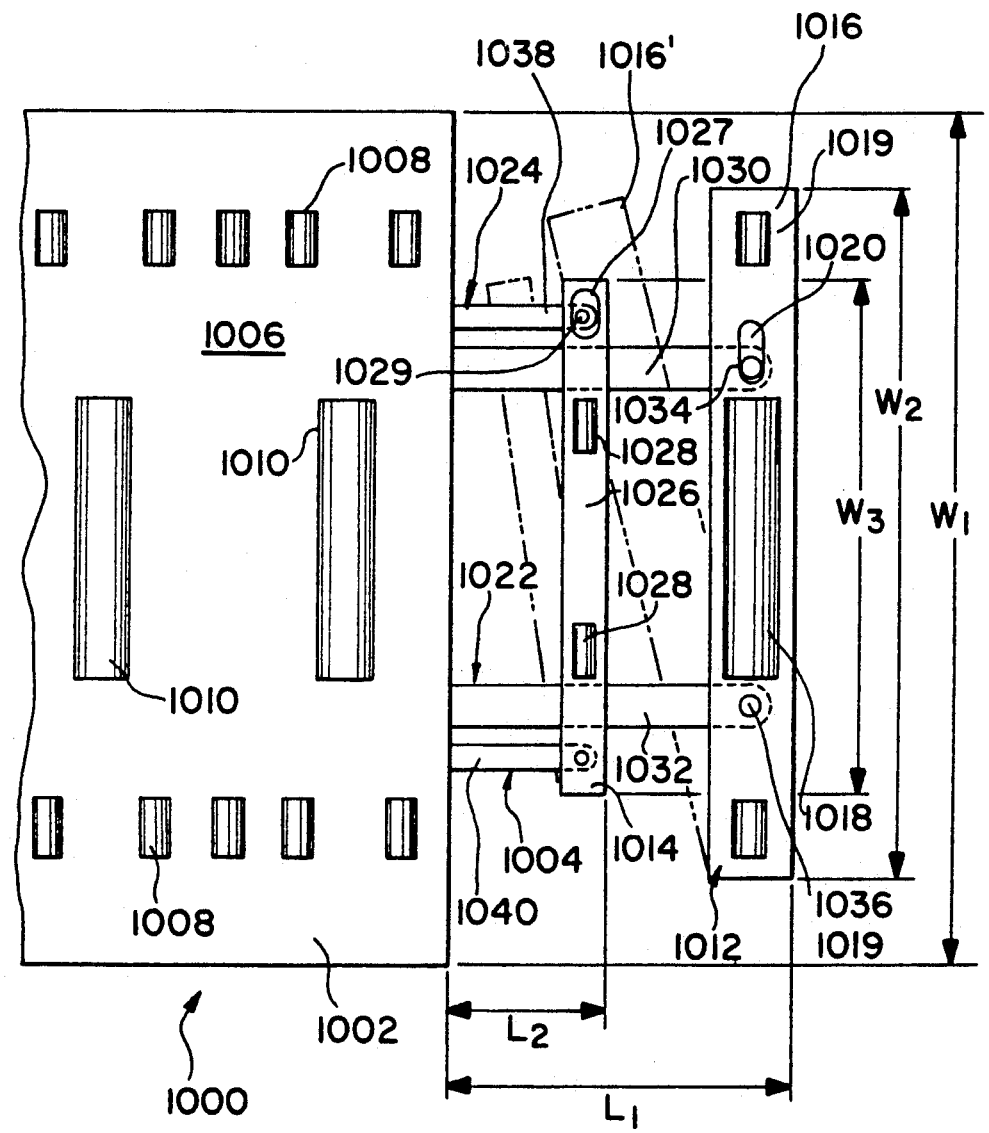
FIG. 19A shows a planar view of another embodiment of the present invention.

FIGS. 19A-25 illustrate another embodiment of the present invention which is particularly suited for the transport of heavy cargo in difficult to reach loading bays and is especially suited for proper positioning of a primary and secondary interface without the need for a high degree of operator expertise. FIG. 19A shows a planar view of interface system 1000 which includes deck structure 1002 and interface assembly 1004. Deck structure 1002 includes an upper surface 1006 having a plurality of non-powered rollers 1008 and a plurality of powered rollers 1010 with the latter preferably being powered and positionable in the same way as the previously described embodiments.

As shown in FIG. 19A interface assembly 1004 includes primary interface 1012 and secondary interface 1014. Primary interface 1012 features main body 1016 and roller 1018 (powered or non-powered) positioned in the midsection of main body 1016 and a pair of non-powered rollers 1019 at the extremities of main body 1016. Main body 1016 has slot 1020 formed to one side of roller 1018.

Secondary interface 1014 includes main body 1026 which includes a pair of non-powered rollers 1028 spaced along the upper surface of main body 1026.

Interface assembly 1004 further includes primary extension-retraction means 1022 and secondary extension-retraction means 1024. Primary extension-retraction means 1022 includes first primary arm 1030 and second primary arm 1032. First primary arm 1030 includes pin 1034 which is slidingly and pivotably received within slot 1020. Second primary arm 1032 includes pin 1036 at its external end and pin 1036 pivotably fixes the external end of arm 1032 to main body 1016.

Secondary extension-retraction means 1024 includes first secondary arm 1038 and second secondary arm 1040. Secondary arm 1040 is pivotably secured to main body 1026 at the end thereof and main body 1026 includes slot 1027 formed at one end which receives in sliding fashion pin 1029 provided at the end of secondary arm 1038. Secondary arms 1038 and 1040 are also positioned laterally outside of primary arms 1030 and 1032.

FIG. 19A shows in solid lines arms 1030 and 1032 of primary extension-retraction means 1022 in their most extended position and arms 1038 and 1040 of secondary extension-retraction means 1024 in their most extended position. FIG. 19A also shows in dashed lines the angled orientation of main bodies 1016 and 1026 when arms 1032 and 1040 are at their maximum extension and arms 1030 and 1038 are near or at their minimum retraction.

FIG. 19A further illustrates deck width W1 (e.g., 108 inches), width W2 of main body 1016 (e.g., 90 inches) and width W3 of main body 1026 (e.g., 58 inches). With width W1 of deck structure 1002 being the widest, the lesser width of main body 1016 is more easily reachable into certain limited spaces associated with cargo bays. Moreover, the intermediate or secondary main body 1026 is positioned so as to facilitate the continued support of cargo as the cargo is passed from the front edge of primary interface 1012 to the front end of deck structure 1002 which is a length L1 (e.g., 24–32 inches). Main body 1026 of secondary interface 1014 is positioned essentially half-way or intermediately (e.g., 12–16 inches) between the front end of deck structure 1002 and main body 1016 (i.e. L1/L2=2).

Figure 19B:
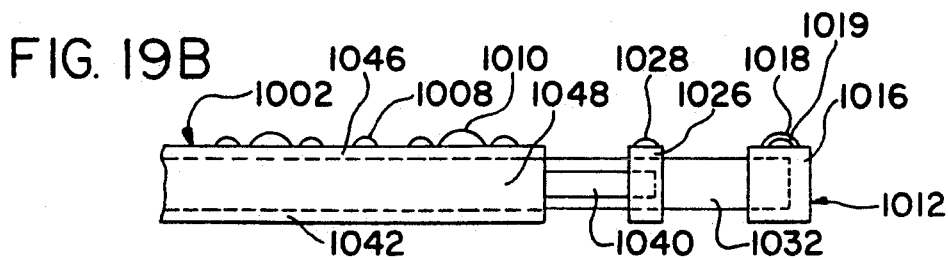
FIG. 19B shows a side view of that which is shown in FIG. 19.

FIG. 19B shows a side view of that which is shown in FIG. 19A. As shown in FIGS. 19A and 19B, main body 1026 has a through-area through which arms 1030 and 1032 extend. The through-area through which arms 1030 and 1032 extend can be lined with low-friction bearing surfaces (e.g. brass). Arms 1038 and 1040 are secured within main body 1026 in between the upper and lower surface of main body 1026. FIG. 19B also illustrates that powered rollers 1018 and 1010 are at the same level while non-powered rollers 1028, 1019 and 1008 are also at the same level. The upper surface of deck structure 1002 is also level with the upper surface of the primary and secondary interfaces.

Figure 20:
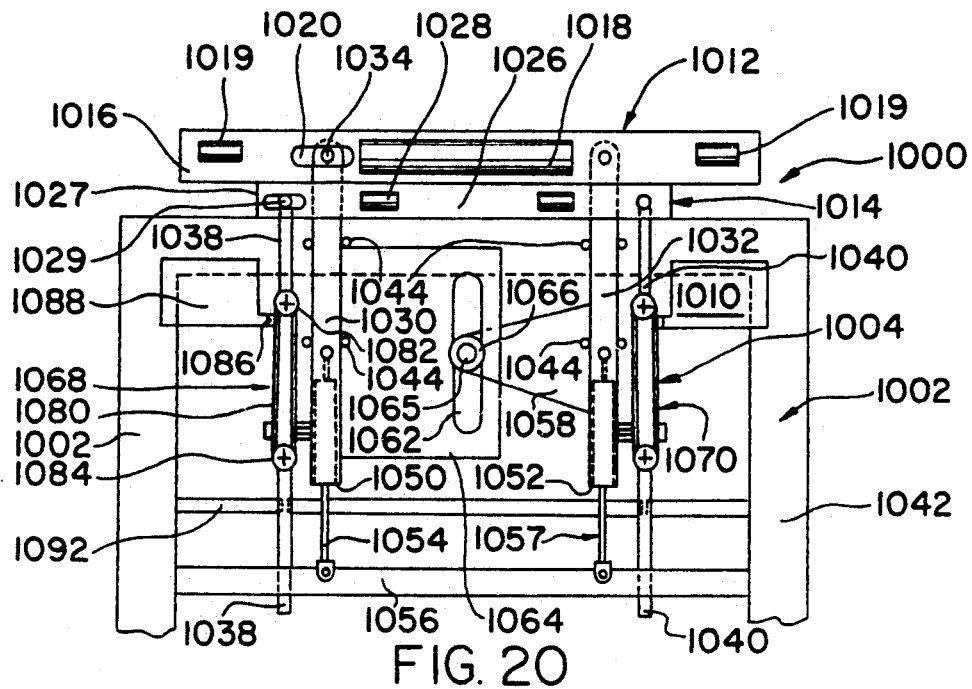
FIG. 20 shows a planar view of that which is shown in FIG. 19A except with the upper portion of the deck structure removed for clarity.

FIG. 20 illustrates a planar view like that in FIG. 19A except with the upper surface of deck 1002 removed for clarity and primary extension-retraction means 1022 and secondary extension-retraction means 1024 in their retracted position.

As shown in FIG. 20, deck structure 1002 includes frame substructure 1042 upon which arms 1030 and 1032 are supported in sliding fashion. To ensure arms 1030 and 1032 remain parallel to one another and transverse to the front end of deck 1002, roller guides 1044 are provided. In a preferred embodiment, guides 1044 are cylindrical rollers extending between substructure 1042 and the upper plate surface 1046 of deck 1002 (FIG. 19B). Frame substructure 1042 is preferably rectangular in shape and is joined at its exterior sides to upper plate 1046 by transversely extending side plates one of which is represented by 1048 in FIG. 19B.

Arms 1030 and 1032 are quadrilateral in cross-section (see FIG. 22) and include a hollow recess along their entire length. Arm 1030 includes internal end 1050 and arm 1032 includes internal end 1052 which are coplanar when the primary and secondary interfaces 1012 and 1014 are in their retracted stowage mode. Received within the hollow internal end 1050 of arm 1030 is first hydraulic assembly 1054. First hydraulic assembly 1054 is fixed at one end to arm 1032 and at its opposite end to beam 1056 which, in turn, is fixed to substructure 1042. Second hydraulic member 1057 is fixed at one end to arm 1032 and at its opposite end to beam 1056.

Main bracket 1058 extends off of the interior side of arm 1032 towards arm 1030. Main bracket 1058 includes pin 1065 which has a center portion which slides within slot 1062 formed in main plate 1064 and an upper flange 1066 which slides on main plate 1064 so as to further support and stabilize arm 1032. Main plate 1064 is secured (e.g., welded) to deck substructure 1042.

FIGS. 20 and 21 illustrate first interplay means 1068 and second interplay means 1070. FIG. 21 illustrates in greater detail interplay means 1068 and the following description concerns interplay means 1068 only as both interplay means 1068 and 1070 operate in the same manner. As shown in FIGS. 21 and 22, arm 1030 includes traversely extending secondary arm guide 1072. Guide 1072 is fixed at one end to the bottom of arm 1030. Also extending traversely off of the exterior side of arm 1030 is securement bar 1074 which has first bracket 1076 fixed to chain or belt 1080 and flange 1078 bolted to arm 1030. Chain 1080 is wrapped about first sprocket 1082 and second sprocket 1084 which are spaced along and rotatably fixed to an upper surface of arm 1038.

While interface system 1000 is in the stowage mode, first bracket 1076 is positioned close to second sprocket 1084 (e.g., one sprocket radius away from center of sprocket along the length of arm 1038). While in the stowage mode, a second bracket 1086 is also secured to chain 1080 only on the opposite (external) side of beam 1038. Second bracket 1086 is spaced from second sprocket 1084 at about the same distance as first bracket 1076 is spaced from first sprocket 1082. Second bracket 1086 is fixed to first lateral plate 1088 (corresponding second lateral plate 1090 is similarly arranged on the opposite side of deck 1002). First and second lateral plates 1088 and 1090 are fixed (e.g., welded) to substructure 1042.

Secondary arm 1038 is supported and guided by guiding beam 1092 which is supported at its ends to substructure 1042. FIG. 23 illustrates arm 1038 received within recess 1094 formed in guiding beam 1092. To facilitate the sliding of arm 1038, low friction bearing layer 1096 is provided. For further stability, Z-shaped brackets 1098 and 1100 are added so as to prevent vertical movement of secondary arm 1038. Alternatively, beam 1092 can have a larger height with a central slot formed therein (not shown) with beam 1038 passing therethrough. With this latter arrangement, a clearance recess (not shown) can be provided to avoid any abutment between primary arm 1030 and beam 1092.

The present invention also contemplates reliance on the guidance provided by guiding beam 1092 without relying on support 1072 (both sides). Thus, with this arrangement each primary arm would include a transverse guide and beam 1092 would be removed. The present invention also contemplates the alternate arrangement wherein reliance is placed on support 1072 and not on guiding beam 1092.

Figure 24:
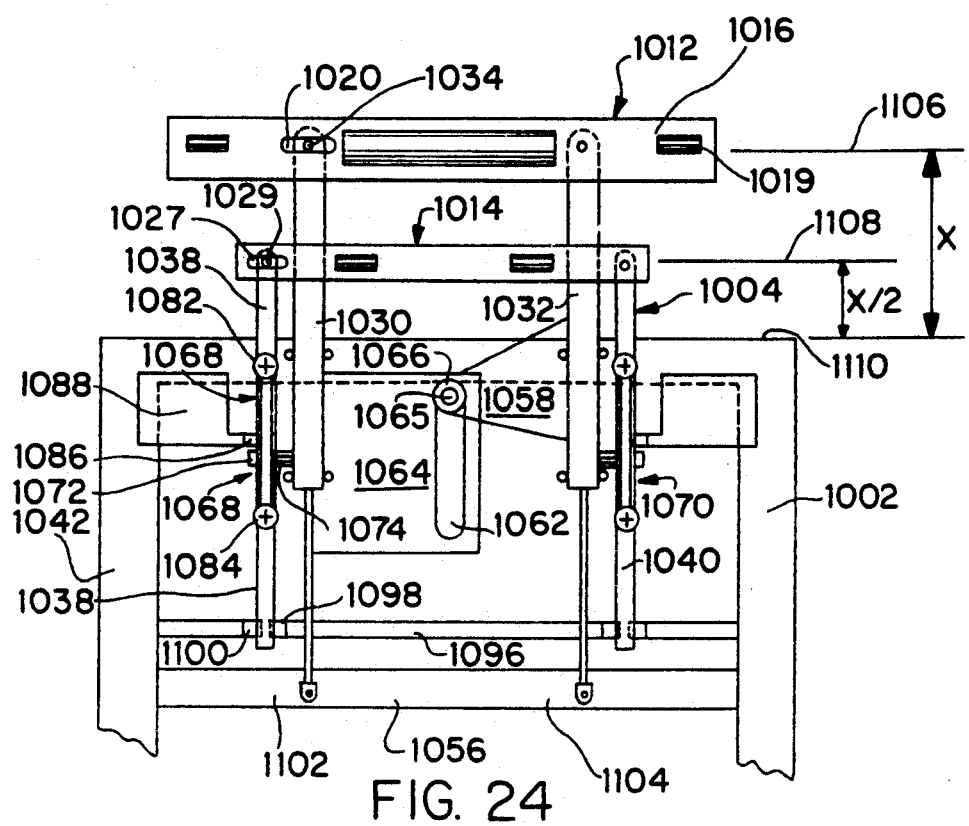
FIG. 24 shows a planar view like that of FIG. 20 except with the interface assembly at maximum extension.

FIG. 24 shows the arrangement of interface assembly 1004 when it is in its most extended position. As shown in FIG. 24, first hydraulics rod 1102 and second hydraulics rod 1104 are extended to their maximum so as to place the end of arms 1038 and 1040 just prior to guide beam 1092. Moreover, center pin 1065 of main bracket 1058 is at the forward most end of slot 1062.

In the most extended position, central axis 1106 of main body 1016 is length X away from front end 1110 of substrate 1042. Also, center axis 1108 of main body 1026 is length X/2 away from front end 1110. As shown in FIG. 24, bracket 1086 and support bar 1074 have moved with chain 1080 as chain 1080 rotated counterclockwise during the extension of primary arm 1030.

Interplay means 1068 and 1070 thus act to coordinate and control the movement of primary and secondary interfaces 1012 and 1014 such that the central axis of interface 1012 is always essentially twice the distance from front end 1110 as interface 1014.

Figure 26:
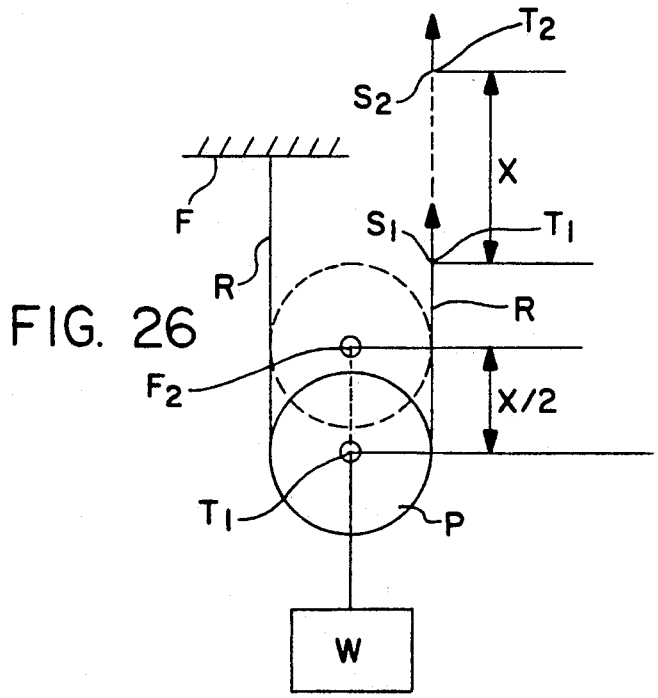
FIG. 26 shows a schematic illustration of the general principle lying behind the coordinated movement of interface 1012 and 1014.

The general principle lying behind the coordinated movement of interface 1012 and 1014 can be seen with reference to FIG. 26. In FIG. 26, pulley P has its center rise, between time periods $T_1$ and $T_2$, a distance X/2 when point S on belt R is moved a distance X. Weight W is used to maintain tension in belt R which is fixed at one end to ceiling F. In the present invention fixed bracket 1086 provides the function of ceiling F discussed above while sprocket 1084 provides the function of pulley P, chain 1080 the function of belt R and the frictional contact between arm 1038 and the supporting surface provides an effect similar to that of weight W.

Figure 25:
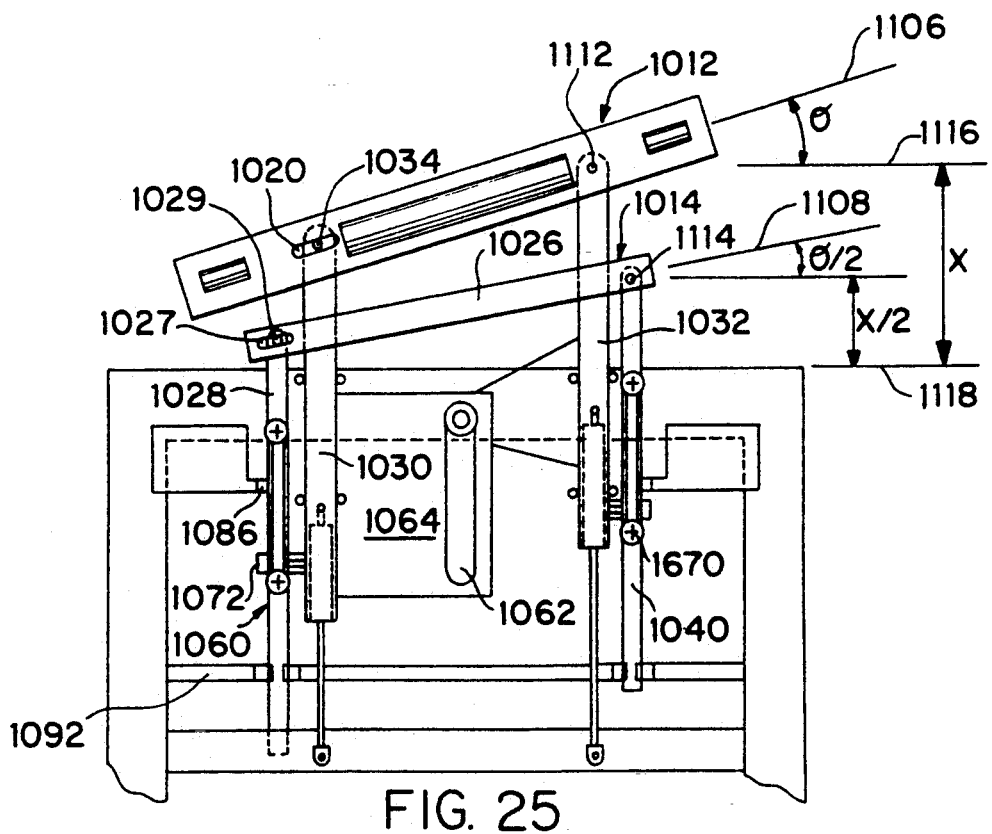
FIG. 25 shows the same view as in FIG. 24 except with the primary and secondary interface at a maximum angle orientation.

FIG. 25 illustrates that the interplay means of the present invention not only halves the distance of extension for interfaces 1012 and 1014 but also halves their angle of orientation. This arrangement is particularly helpful in providing evenly distributed support to a load being transferred between deck 1002 and a cargo bay. As shown in FIG. 25, arm 1032 is fully extended as it was shown in FIG. 24. Arm 1030, however, is non-extended or only slightly extended from its stowage position. Slots 1020 and 1027 and the associated pins 1029, 1034 provide the required play to handle the hypotenuse positionment of main bodies 1016 and 1026. With this arrangement, horizontal line 1116 extending through pivot pin 1112 forms an angle "θ" with respect to central axis 1106. Also, because of the interplay means 1068 and 1070, the angle formed between a line parallel to horizontal line 1118 and extending through pivot 1114 and central axis 1108 is "θ/2".

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. An interface system for a cargo loader, comprising:
   first and second extension-retraction means positioned in spaced relationship with one another, and each having a first end adapted for connection with a deck of a cargo loader and a second end; and
   an interface assembly secured to the second end of said first and second extension-retraction means, said interface assembly having
   a main body with an upper and a lower surface and a first and a second end, the first end of said main body being pivotally secured to the second end of said first extension-retraction means and the second end of said main body being pivotably secured to the second end of said second extension-retraction means,
   a first lateral extension member having a first end pivotably secured to the first end of said main body and a second end, the first end of said first lateral extension member being pivotably secured to said main body about an axis which extends between the upper and lower surfaces of said main body,
   a second lateral extension member having a first end pivotably secured to the second end of said main body and a second end, and the first end of said second lateral extension member being pivotally secured to said main body about an axis which extends between the upper and lower surface of said main body,
   first locking means for locking said first lateral extension in an extended position wherein said first lateral extension extends out away from both said first and second extension-retraction means and a first locking assembly for locking said first lateral extension in a retracted position wherein said first lateral extension extends out away from said first extension-retraction means and towards said second extension-retraction means,
   second locking means for locking said second lateral extension in an extended position wherein said second lateral extension member extends out away from both said first and second extension-retraction means and a second locking assembly for locking said second lateral extension member in a retracted position wherein said second lateral extension extends out away from said second extension-retraction means and towards said first extension-retraction means.

2. An interface system as recited in claim 1 wherein said first and second lateral extensions each include a support beam and said first and second lateral extensions each include, at the first end, a bracket member extending transverse to said support beam, said first and second locking means also each including a pivot pin secured to said main body and pivotably secured to said bracket member on one side of said support beam, said first and second locking means each comprising disengageable engagement means supported by said bracket member on an opposite side of said support beam for releasably fixing said lateral extensions in the extended position, and said first and second locking assemblies each further comprising a first lock member secured to a respective one of said lateral extensions and a second lock member secured to said main body and said first and second lock members being dimensioned and arranged such that said lateral extensions are releasably locked by said first and second lock members in the retracted position.

3. An interface system as recited in claim 2 further comprising exterior roller assemblies positioned on each of said lateral extension members said roller assemblies including rollers and releasable locking means which, when engaged, lock said rollers in a raised position and when disengaged result in said rollers being freely pivotable to a lowered position.

4. An interface system as recited in claim 3 further comprising interior roller assemblies positioned on said main body and including rollers and releasable locking means which, when engaged, position said rollers in a raised position and when disengaged, result in said rollers being freely pivotable to a lowered position.

5. An interface cargo system as recited in claim 2 wherein said disengageable engagement means includes a cylinder supported by said bracket member and said cylinder having a slot extending axially therealong, a pair of engagement pins having gripping means and positioned within said cylinder so as to have said gripping means extending through said slot, and a spring positioned between said engagement pins to bias said pins outwardly.

6. An interface system as recited in claim 1 further comprising exterior roller assemblies positioned on each of said lateral extension members, said roller assemblies including rollers and releasable locking means which, when engaged, lock said rollers in a raised position and when disengaged result in said rollers being freely pivotable to a lowered position.

7. A interface system as recited in claim 6 further comprising interior roller assemblies positioned on said main body and including rollers and releasable locking means which, when engaged, position said rollers in a raised position and when disengaged, result in said rollers being freely pivotable to a lowered position.

8. An interface cargo system as recited in claim 1 further comprising a powered roller assembly supported by said main body, said powered roller assembly including rollers and means for driving said rollers and means for raising said rollers to a position above the upper surface of said main body and for lowering said rollers to a position below the upper surface of said main body.

9. An interface system as recited in claim 1 wherein said first and second extension-retraction means each include an elongated arm and a hydraulic member connected at one end to said arm and at an opposite end to the deck such that said first and second arms are independently extendable and retractable away and towards the deck.

10. An interface system as recited in claim 9 wherein said main body includes a plate with a slot, and said arm of said second extension-retraction means is slidingly fixed within said slot such that said main body is angled when said arms are extended away from the deck for different lengths.

11. An interface system as recited in claim 1 wherein said main body includes a central axis extending between the first and second ends of said main body and wherein said locking means is dimensioned and arranged such that said lateral extensions extend out essentially along the central axis of said main body when in the extended position and extend inwardly along an axis which is spaced and parallel to the central axis of said main body when in the retracted position.

12. An interface system as recited in claim 11 wherein said locking means and dimension are arranged such that said lateral extensions pivot essentially 180° in passing between said extended position and said retracted position.

13. An interface assembly as recited in claim 7 further comprising a powered roller assembly supported by said main body, said powered roller assembly including laterally spaced rollers and means for driving said laterally spaced rollers and means for raising said rollers to a position above the upper surface of said main body and for lowering said rollers to a position below the upper surface of said main body.

14. An interface assembly as recited in claim 1 wherein said lateral extension members include a support beam and a bracket member with the support beam and bracket member arranged such that each lateral extension has a T-shaped cross-section along a horizontal bisecting plane.

15. An interface assembly as recited in claim 14 wherein each of said support beams support a first and a second roller with the first roller being on one side of the support beam and a second roller being on an opposite side of said support beam and said first and second rollers being laterally spaced along each of said support beams.

16. An interior assembly as recited in claim 15 further comprising interior roller assemblies supported by said main body such that each interior roller assembly is positioned laterally outward of one of said rollers on said lateral extension members when said lateral extensions are in said retracted position.

17. An interface system for a cargo loader, comprising:
a deck having a front end, an upper surface and a bottom surface, and said deck having a storage compartment formed in the upper surface and at the front end of said deck;
first and second extension-retraction means positioned in spaced relationship with each other and each having a first end supported by said deck and a second end;
an interface assembly secured to the second end of said first and second extension-retraction means, said interface assembly including,
a main body secured to said first and second extension-retraction means, said main body having an upper and a lower surface and a first and second end,
a first lateral extension member pivotably secured to the first end of said main body, said first lateral extension being adapted to rotate about an axis extending between the upper and lower surface of said main body,
a second lateral extension member pivotably secured to the second end of said main body, said second lateral extension being adapted to rotate about an axis extending between the upper and lower surface of said main body,
first locking means for locking said first lateral extension in an extended position wherein said first lateral extension extends away from both said first and second extension-retraction means and a first locking assembly for locking said first lateral extension in a retracted position wherein said first lateral extension extends out away from said first extension-retraction means and towards said second extension-retraction means,
second locking means for locking said second lateral extension in an extended position wherein said second lateral extension extends away from both said first and second extension retraction means and a second locking assembly for locking said second lateral extension in a retracted position wherein said second lateral extension extends away from said second extension-retraction means and towards said first extension-retraction means.

18. An interface system as recited in claim 17 wherein said first and second extension-retraction means each include an elongated arm pivotably secured at one end to said main body and slidingly received within an elongated recesses formed in said deck.

19. An interface system as recited in claim 18 wherein said extension-retraction means include sliding means for sliding said arms within said elongated recesses, and wherein said arms and said corresponding recesses are dimensioned and arranged so as to limit movement of said arms to sliding travel solely along a central axis of said elongated recesses.

20. An interface system as recited in claim 19 wherein said main body includes a slotted plate within which a second end of the arm of said second extension-retraction member is slidingly retained, and said arms being independently slidable by said sliding means so as to angle said interface assembly.

21. An interface system as recited in claim 17 wherein said lateral extension members include a support beam with a first side, and first and second roller assemblies positioned on the first side of a respective one of said support beams, said main body including a recessed front section and third and fourth roller assemblies supported by said main body and spaced along the recessed front section of said main body, and said first and second roller assemblies including rollers having an axis of rotation which is common with the axis of rotation of rollers of said third and fourth roller assemblies when said lateral extension members are in the retracted position.

22. An interface assembly for a cargo loader, comprising:
   a first and a second extension-retraction assembly positioned in spaced relationship with respect to each other, and each extension-retraction assembly having a first end adapted for connection with a cargo loader and a second end; and
   an interface assembly having a main body pivotably secured to the second end of said first and said second extension-retraction assembly,
   a first lateral extension member pivotably supported by a first end of said main body, said first lateral extension including a support beam and a bracket member joined to one end of said support beam and extending transverse to said support beam so as to form a T-shaped combination, and one end of said bracket member being pivotably secured to said one end of said main body such that said first lateral extension is adapted for pivoting movement between a retracted position wherein said support beam is juxtaposed to a front end of said main body and an extended position wherein said support beam extends laterally out away from said main body,
   a second lateral extension member pivotably supported by a second end of said main body, said second lateral extension including a support beam and a bracket member joined to one end of said support beam and extending transverse to said support beam so as to form a T-shaped combination, and one end of said bracket member of said second lateral extension being pivotably secured to the second end of said main body such that said second lateral extension is adapted for pivoting movement between a retracted position wherein the support beam of said second lateral extension is juxtaposed to a front end of said main body to a second position wherein the support beam of said second lateral extension laterally extends out away from said main body,
   a first locking assembly for locking said first lateral extension in the extended position, said first locking assembly being dimensioned and arranged so as to releasably fix the bracket member of said first lateral extension to said main body, and
   a second locking assembly for locking said second lateral extension in the extended position, said second locking assembly being dimensioned and arranged so as to releasably fix the bracket members of said second lateral extension member to said main body.

23. An interface system as recited in claim 22 wherein said first and second locking assemblies engage an end of said bracket member which is opposite to the end pivotably secured to said main body.

24. An interface system as recited in claim 22 wherein said support beam of said first and second lateral extension members, includes a roller assembly.

* * * * *